(12) United States Patent
Gautam et al.

(10) Patent No.: US 12,376,023 B2
(45) Date of Patent: Jul. 29, 2025

(54) SYSTEM AND METHOD CONFIGURING A SLICE PROFILE IN A FIFTH GENERATION NETWORK

(71) Applicant: Samsung Electronics Co., Ltd., Suwon-si (KR)

(72) Inventors: Deepanshu Gautam, Bangalore (IN); Jaijin Lim, Suwon-si (KR); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 18/013,340

(22) PCT Filed: Jul. 7, 2021

(86) PCT No.: PCT/KR2021/008618
§ 371 (c)(1),
(2) Date: Dec. 28, 2022

(87) PCT Pub. No.: WO2022/010247
PCT Pub. Date: Jan. 13, 2022

(65) Prior Publication Data
US 2023/0284127 A1 Sep. 7, 2023

(30) Foreign Application Priority Data

Jul. 7, 2020 (IN) ............................. 202041028882
Jun. 16, 2021 (IN) ............................. 202041028882

(51) Int. Cl.
*H04W 48/18* (2009.01)
*H04W 24/10* (2009.01)
(52) U.S. Cl.
CPC ........... *H04W 48/18* (2013.01); *H04W 24/10* (2013.01)

(58) Field of Classification Search
CPC .............................. H04W 48/18; H04W 24/10
(Continued)

(56) References Cited

U.S. PATENT DOCUMENTS 11,438,831 B2 * 9/2022 Stille .................... H04M 15/63
12,089,149 B2 * 9/2024 Prabhakar ........... H04L 41/0895
(Continued)

FOREIGN PATENT DOCUMENTS

WO    2019/243113 A1    12/2019

OTHER PUBLICATIONS

'3GPP; TSG SA; Management and orchestration; 5G Network Resource Model (NRM); Stage 2 and stage 3 (Release 16)', 3GPP TS 28.541 V16.4.1, Apr. 1, 2020.
(Continued)

*Primary Examiner* — Anthony Mejia
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose a system and method for configuring slice profile in a Fifth Generation (5G) network. The method comprises determining root slice profile from a Service Profile (101). Further, generating one or more subnet slice profiles (102) associated with corresponding one or more network domains of the 5G network from the root slice profile. Furthermore, classifying one or more attributes (501) in each of the one or more subnet slice
(Continued)

profiles (102) as configurable attributes (103) or as non-configurable attributes for the corresponding one or more network entities (105) in the corresponding network domain. Thereafter, providing the one or more attributes (501) categorized as the configurable attributes (103) to the corresponding one or more network entities (105) for enforcing the configurable attributes (103). Finally, providing the one or more attributes (501) categorized as the non-configurable attributes to the corresponding one or more OAM entities for enforcing the non-configurable attributes.

14 Claims, 24 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2017/0141973 A1 | 5/2017 | Vrzic | |
| 2017/0164212 A1 | 6/2017 | Opsenica et al. | |
| 2017/0332295 A1* | 11/2017 | Sunay | H04W 12/06 |
| 2018/0234915 A1 | 8/2018 | Zait | |
| 2019/0364492 A1* | 11/2019 | Azizi | H04W 4/024 |
| 2021/0250853 A1 | 8/2021 | Corston-Petri et al. | |
| 2021/0274433 A1* | 9/2021 | Mhapsekar | H04W 48/16 |
| 2023/0209370 A1* | 6/2023 | Pateromichelakis | G06N 20/00 370/328 |
| 2023/0247686 A1* | 8/2023 | Jeong | H04W 76/10 455/414.1 |
| 2023/0354165 A1* | 11/2023 | Sempere | H04W 8/183 |
| 2024/0297822 A1* | 9/2024 | Luthra | H04L 41/0895 |

OTHER PUBLICATIONS

3GPP SA5, 'LS on analysis of GSMA GST attributes', S2-2003518, SA WG2 Meeting #S2-139E, Electronic, Elbonia, Apr. 29, 2020.
3GPP; "LS on analysis of GSMA GST attributes"; SA WG2 Meeting #S2-136AH; S2-2000063; Jan. 13-17, 2020, Incheon, South Korea, Apr. 29, 2020.
Samsung Electronics Benelux BV, "Rel-17 CR Additional KPI Definition for Max Subscriber and PDU Session"; 3GPP TSG-SA5 Meeting #132-e; S5-204494; Aug. 17-28, 2020; Online, Sep. 3, 2020.
Samsung, "Rel-17 InputToDraftCR for WI eMA5SLA Slice Profile.docx"; TSG SA WG5 Meeting #135-e; S5-211504; Jan. 25-Feb. 3, 2021; electronic meeting, online, Feb. 5, 2021.
Samsung et al., "InputToDraftCR for WI eMASSLA Configuration Parameters"; TSG-SA5 Meeting #135; S5-211505; Jan. 25- Feb. 3, 2021; Online, Feb. 5, 2021.
Indian Examination Report dated May 6, 2022, issued in Indian Application No. 202041028882.

* cited by examiner

FIG. 6A

| SL.NO | GST Attributes | M/C/O | Category | Sub-Category | Service Profile Level | |
|---|---|---|---|---|---|---|
| | | | | | Service Profile | M/C/O |
| 1 | Area of Service | O | Coverage | Non-Configurable parameters | coverageArea | O |
| 2 | Area of Service: Region Specification | C | Coverage | Non-Configurable parameters | coverageArea | O |
| 3 | Energy efficiency: network slice energy efficiency per slice | O | Feature | Non-Configurable parameters | energyEfficiency | O |
| 4 | Energy efficiency: time frame of the measurement per slice | C | Feature | Non-Configurable parameters | energyEfficiency. Time | O |
| 5 | Group communication support | O | Feature | Non-Configurable parameters | grpCommSupport | O |
| 6 | Isolation level: isolation | O | Feature | Non-Configurable parameters | isolation. Physical | O |
| 7 | Isolation level: physical isolation | C | Feature | Non-Configurable parameters | isolation. Logical | O |
| 8 | Isolation level: logical isolation | C | Feature | Non-Configurable parameters | resourceSharingLevel | O |
| 9 | Location based message delivery | O | Feature | Non-Configurable parameters | locBasedMsgDelivery | O |
| 10 | Mission critical support | O | Feature | Non-Configurable parameters | mcSupport | O |
| 11 | Mission critical support: mission-critical capability support | C | Feature | Non-Configurable parameters | mcSupport. capability | O |
| 12 | Mission critical support: mission-critical service support | C | Feature | Non-Configurable parameters | mcSupport. service | O |
| 13 | MMTel support | O | Feature | Non-Configurable parameters | mMTelSupport | O |
| 14 | NB-Iot support | O | Feature | Non-Configurable parameters | nB-IOTSupport | O |
| 15 | Network Slice Customer network functions | O | Feature | Non-Configurable parameters | sliceCustomerNF | O |
| 16 | Performance monitoring: monitoring sample frequency | O | Feature | Non-Configurable parameters | perMonitoring | O |
| 17 | performance monitoring: availability | O | Feature | Non-Configurable parameters | perMonitoring. availability | O |
| 18 | performance perdiction: availability | O | Feature | Non-Configurable parameters | perPrediction.frequency | O |

FIG. 6B

| Slice Profile Level | | | | Slice Profile Level | | | |
|---|---|---|---|---|---|---|---|
| Root Slice Profile | M/C/O | CN Slice Profile | M/C/O | RAN Slice Profile | M/C/O | TN Slice Profile | M/C/O |
| coverageAreaTAList | O | - | - | coverageAreaTAList | O | - | - |
| coverageAreaTAList | O | - | - | coverageAreaTAList | O | - | - |
| energyEfficiency | O | energyEfficiency | O | energyEfficiency | O | energyEfficiency | O |
| energyEfficiency.Time | O | energyEfficiency.Time | O | energyEfficiency.Time | O | energyEfficiency.Time | O |
| grpCommSupport | O | grpCommSupport | O | - | - | - | - |
| isolation.Physical | O | isolation.Physical | O | isolation.Physical | O | isolation.Physical | O |
| isolation.Logical | O | isolation.Logical | O | isolation.Logical | O | isolation.Logical | O |
| resourceSharingLevel | O | resourceSharingLevel | O | resourceSharingLevel | O | resourceSharingLevel | O |
| locBasedMsgDelivery | O | locBasedMsgDelivery | O | locBasedMsgDelivery | O | - | - |
| mcSupport | O | mcSupport | O | mcSupport | O | mcSupport | O |
| mcSupport.capability | O | mcSupport.capability | O | mcSupport.capability | O | mcSupport.capability | O |
| mcSupport.service | O | mcSupport.service | O | mcSupport.service | O | mcSupport.service | O |
| mMTelSupport | O | mMTelSupport | O | mMTelSupport | O | mMTelSupport | O |
| nB-IOTSupport | O | nB-IOTSupport | O | nB-IOTSupport | O | - | - |
| sliceCustomerNF | O | sliceCustomerNF | O | - | - | - | - |
| perMonitoring | O | perMonitoring | O | perMonitoring | O | perMonitoring | O |
| perMonitoring.availability | O | perMonitoring.availability | O | perMonitoring.availability | O | perMonitoring.availability | O |
| perPrediction.frequency | O | perPrediction.frequency | O | perPrediction.frequency | O | perPrediction.frequency | O |

FIG. 6C

| Network Function Level |||
|---|---|---|
| Configured NF | Enforcing NF | Confguration Parameter [value] |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |

FIG. 6D

| 19 | Performance prediction: predicrion frequency | O | Feature | Non-Configurable parameters | petPrediction.availability | O |
|---|---|---|---|---|---|---|
| 20 | Positioning support: availability | O | Feature | Non-Configurable parameters | posSupport.availability | O |
| 21 | Positioning support: prediction frequency | O | Feature | Non-Configurable parameters | posSupport.frequency | O |
| 22 | Positioning support: accuracy | O | Feature | Non-Configurable parameters | posSupport.accuracy | O |
| 23 | Radio spectrum | O | Feature | Non-Configurable parameters | radioSpectrum | O |
| 24 | Root cause investigation | O | Feature | Non-Configurable parameters | rootCauseInvestigation | O |
| 25 | Session and Service continuity support | M | Feature | Non-Configurable parameters | servicecontinuity | M |
| 26 | Support for non-IP traffic | O | Feature | Non-Configurable parameters | non-IPTrafficSupport | O |
| 27 | Synchronicity: availability | O | Feature | Non-Configurable parameters | syn.availability | O |
| 28 | Synchronicity: accuracy | O | Feature | Non-Configurable parameters | syn.accuracy | O |
| 29 | User data access: data access | O | Feature | Non-Configurable parameters | userDataAccess | O |
| 30 | User data access: tunneling mechanism | O | Feature | Non-Configurable parameters | userDataAccess.tunneling | O |
| 31 | Supported device velocity | O | Feature | Non-Configurable parameters | uEMobilityLevel.uESpeed | O |
| 32 | User management openness | O | Feature | Non-Configurable parameters | userMgmtOpen | O |
| 33 | V2X communication mode | O | Feature | Non-Configurable parameters | v2XCommModels | O |
| 34 | Delay tolerance | O | Feature | Non-Configurable parameters | delayTolerance | O |
| 35 | Deterministic communication: availability | O | Feature | Non-Configurable parameters | deterministicComm | O |
| 36 | Deterministic communication: periodicity | C | Feature | Non-Configurable parameters | deterministicComm | O |
| 37 | Reliability | O | Feature | Non-Configurable parameters | reliability | O |
| 38 | Simultaneous use of the network slice | O | Feature | Configurable Parameters | sliceSimultaneousUse | O |

FIG. 6E

| | petPrediction.availability | | petPrediction.availability | | petPrediction.availability | |
|---|---|---|---|---|---|---|
| petPrediction.availability | O | O | petPrediction.availability | O | petPrediction.availability | O |
| posSupport.availability | O | O | posSupport.availability | O | posSupport.availability | O |
| posSupport.frequency | O | O | posSupport.frequency | O | posSupport.frequency | O |
| posSupport.accuracy | O | O | posSupport.accuracy | O | posSupport.accuracy | O |
| radioSpectrum | O | - | radioSpectrum | O | | - |
| rootCauseInvestigation | O | O | rootCauseInvestigation | O | rootCauseInvestigation | O |
| servicecontinuity | M | M | servicecontinuity | M | servicecontinuity | M |
| non-IPTrafficSupport | O | O | | - | | - |
| | - | - | syn.availability | O | | - |
| | - | - | syn.accuracy | O | | - |
| userDataAccess | O | O | | - | userDataAccess | O |
| userDataAccess.tunneling | O | O | userDataAccess.tunneling | O | userDataAccess.tunneling | O |
| uEMobilityLevel | O | O | uEMobilityLevel | O | | - |
| userMgmtOpen | O | O | userMgmtOpen | O | userMgmtOpen | O |
| v2XCommModels | O | O | v2XCommModels | O | | - |
| delayTolerance | O | O | delayTolerance | O | delayTolerance | O |
| deterministicComm | O | O | deterministicComm | O | deterministicComm | O |
| deterministicComm | O | O | deterministicComm | O | deterministicComm | O |
| reliability | O | - | reliability | - | reliability | O |
| sliceSimultaneousUse | O | O | | - | | - |

FIG. 6F

| NSSMF | NSSMF | As defined in GST (NG.116) |
|---|---|---|
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | As defined in GST (NG.116) |
| NSSMF | NSSMF | 0. Can be used with any network slice<br>1. Can be used with network slices with same SST value<br>2. Can be used with any network slice with same SD value<br>3. Cannot be used with another network slice<br>4. Cannot be used with by UE in a specific location represented by TAI List. |

FIG. 6G

| 39 | Downlink throughput per network slice: guaranteed | O | Performance | Configurable Parameters | minDlThptPerSlice | O |
|---|---|---|---|---|---|---|
| 40 | Downlink throughput per network slice: maximum | O | Performance | Configurable Parameters | dLThptPerSlice | O |
| 41 | Downlink throughput per UE by slice: guaranteed | C | Performance | Configurable Parameters | minDlThptPerUE | O |
| 42 | Downlink throughput per UE by slice: maximum | O | Performance | Configurable Parameters | dLThptPerUE | O |
| 43 | Number of connections | C | Performance | Configurable Parameters | maxNumberofConns | C |
| 44 | Number of terminals | C | Performance | Configurable Parameters | maxNumberofUEs | C |
| 45 | Uplink throughput per network slice: guaranteed | O | Performance | Configurable Parameters | minUlThptPerSlice | O |
| 46 | Uplink throughput per network slice: maximum | O | Performance | Configurable Parameters | uLThptPerSlice | O |
| 47 | Uplink throughput per UE by slice: guaranteed | O | Performance | Configurable Parameters | uLThptPerUE | O |
| 48 | Uplink throughput per UE by slice: maximum | O | Performance | Configurable Parameters | uLThptPerUE | O |
| 49 | Maximum supported packt size | O | Performance | Configurable Parameters | maxPktSize | O |
| 50 | Slice quality of service parameters: 3GPP 5QI | M | Feature | Configurable Parameters | serviceQuality.5QI | M |
| 51 | Slice quality of service parameters: resource type | C | Feature | Configurable Parameters | serviceQuality.resourcetype | C |
| 52 | Slice quality of service parameters: priority level | C | Feature | Configurable Parameters | serviceQuality.prioritylevel | C |
| 53 | Slice quality of service parameters: packet delay budget | C | Feature | Configurable Parameters | serviceQuality.packetdelaybudget | C |
| 54 | Slice quality of service parameters: packet error rate | C | Feature | Configurable Parameters | serviceQuality.packeterrorrate | C |
| 55 | Slice quality of service parameters: jitter | O | Feature | Configurable Parameters | jitter | O |
| 56 | Slice quality of service parameters: maximum packet loss rate | O | Feature | Configurable Parameters | maximumQuality.packetlossrate | O |

FIG. 6H

| | | | | |
|---|---|---|---|---|
| minDlThptPerSlice | O | minDlThptPerSlice | O | - |
| maxDlThptPerSlice | O | maxDlThptPerSlice | | - |
| minDlThptPerUE | O | minDlThptPerUE | O | - |
| maxDlThptPerUE | O | maxDlThptPerUE | O | - |
| maxNumofPDUSessionPerSlice | C | | | - |
| maxNumberofUEs | C | | | - |
| minUlThptPerSlice | O | minUlThptPerSlice | O | - |
| maxUlThptPerSlice | O | | | - |
| minUlThptPerUE | O | minUlThptPerUE | O | - |
| maxUlThptPerUE | O | maxUlThptPerUE | O | - |
| maxPktSize | O | - | - | - |
| serviceQuality.5QI | M | - | - | - |
| serviceQuality.resourcetype | C | - | - | - |
| serviceQuality.prioritylevel | C | - | - | - |
| parametersQuality.packetdelaybudget | C | - | - | - |
| parametersQuality.packeterrorrate | C | - | - | - |
| serviceQuality.jitter | O | - | - | - |
| maximumQuality.packetlossrate | O | - | - | - |

FIG. 6I

| UPFFunction, GNBCUUPFunction, GNBDUFunction | UPFFunction, GNBCUUPFunction, GNBDUFunction | minDlThptPerSlice [Integer in mbps/gbps] |
|---|---|---|
| UPF | UPF | maxDlThptPerSlice [Integer in mbps/gbps] |
| PCRF | UPF, GNBCUUPFunction, GNBDUFunction | minDlThptPerUE [Integer in mbps/gbps] |
| UDM | GNBCUUPFunction, GNBDUFunction | maxDlThptPerUE [Integer in mbps/gbps] |
| SMF | SMF | maxNumofPDUSessionPerSlice [Integer] |
| AMF | AMF | maxNumofUEPerSlice [Integer] |
| UPFFunction, GNBCUUPFunction, GNBDUFunction | UPFFunction, GNBCUUPFunction, GNBDUFunction | minUlThptPerSlice [Integer in mbps/gbps] |
| UPF | UPF | maxUlThptPerSlice [Integer in mbps/gbps] |
| PCRF | UPF, GNBCUUPFunction, GNBDUFunction | minUlThptPerUE [Integer in mbps/gbps] |
| UDM | GNBCUUPFunction, GNBDUFunction | maxUlThptPerUE [Integer in mbps/gbps] |
| SMF | SMF | As defined in GST [NG.116] |
| SMF | SMF | As defined in GST [NG.116] |
| SMF | SMF | As defined in GST [NG.116] |
| SMF | SMF | As defined in GST [NG.116] |
| SMF | SMF | As defined in GST [NG.116] |
| SMF | SMF | As defined in GST [NG.116] |
| SMF | SMF | As defined in GST [NG.116] |
| SMF | SMF | As defined in GST [NG.116] |

SYSTEM AND METHOD CONFIGURING A SLICE PROFILE IN A FIFTH GENERATION NETWORK

TECHNICAL FIELD

The present disclosure relates to a field of Fifth Generation (5G) network, in particular relates to a system and method for configuring a slice profile in a 5G network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "wired/wireless communication and network infrastructure" "interface technology" " " have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, Network slicing is the key feature of the 5G networks that enables to build dedicated logical networks on a shared infrastructure. These dedicated networks would permit the implementation of tailor-made functionality and network operation specific to the needs of each slice customer, rather than a one-size-fits-all approach as witnessed in the existing and previous mobile generations, which would not be economically viable. Further, Global System for Mobile Communications Association (GSMA) has worked on GSMA Generic Slice Template (GST) to provide a standardized list of attributes that can characterize a type of network slice. The GST is generic and is not tied to any specific network deployment. The $3^{rd}$ Generation Partnership Project (3GPP) SA5 specifications (TS 28.541) have adopted the concept of GST and have discussed the mechanism to use GST in Slice Management. The GSMA GST is used as the Service Level Specification (SLS) information for the communication between the vertical industry and the communication service provider. The SLS requirements can be fulfilled from management aspect and control aspect in a coordinated way. The SLS includes service profile information model.

Further, the 3GPP has adopted GST values into the service profile. The service profile includes requirements associated with the network slice. For example, a user equipment may use two network slices i.e., network slice A and network slice B for different use cases as shown in FIG. 1. The service profile A and service profile B includes requirements associated with the network slice A and network slice B respectively. However, the some requirements in the service profile needs to be configured at various network domains such as access network, edge network, transport network and core network as shown in FIG. 0.1. Therefore, there is a need to identify the requirements associated with each of the network domains and provide the requirements to the corresponding network domains via configuration. Once configured the requirements will be enforced at a runtime. Further, some attributes for example, a Vehicle to everything (V2X) communication support, Mission Critical (MC) support, and the like, does not require a translation into configuration parameter. The enforcement for such attributes will be done during slice provisioning.

In conventional methods and systems, GST attributes have been adopted in SA5 specification in the service profile. The existing techniques do not provide a translation mechanism from the requirements to the configuration parameter and do not provide the enforcement mechanisms of the requirements.

Thus, it is desired to address the above mentioned disadvantages or other shortcomings or at least provide a useful alternative.

DISCLOSURE OF INVENTION

Technical Problem

The principal object of the embodiments herein is to provide a system and method for configuring a slice profile in a Fifth Generation (5G) network.

Another object of the embodiment herein is to classify Global System for Mobile Communications (GSMA)

Generic Network Slice Template (GST) attributes into one of a configurable attribute and a non-configurable attribute.

Another object of the embodiment here is to provide an enforcement technique for the configurable attributes and non-configurable attributes.

Another object of the embodiment here is to provide a Key Performance Indicator (KPI) for the GST attribute including a maximum number of PDU sessions per network slice.

Another object of the embodiment here is to generate multiple slice profile for subnet slice corresponding to each of the one or more network domains of the 5G network.

Solution to Problem

Accordingly, embodiments herein disclose method of configuring a subnet slice profile by a network entity in a Fifth Generation (5G) network. The method comprises determining a root slice profile from a Service Profile, wherein the Service Profile comprises one or more attributes associated with a Global System for Mobile Communications (GSMA) Generic Network Slice Template (GST). Further, the method comprises generating one or more subnet slice profiles associated with corresponding one or more network domains of the 5G network from the root slice profile. Furthermore, the method comprises determining from the one or more attributes, the attributes relevant for the generated subnet slice profile. Finally, the method comprises enforcing the relevant attributes for configuring the subnet slice profile.

In an embodiment, the one or more attributes includes configurable attributes and non-configurable attributes.

an embodiment, identifying a category associated with each of the one or more attributes in the one or more subnet slice profiles, wherein the category comprises at least one of a performance, a quality, a coverage and a feature. Further, classifying the one or more attributes as the configurable attributes when the category associated with the one or more attributes indicates a quantifiable value. Alternatively, classifying one or more attributes in each of the one or more subnet slice profiles as non-configurable attributes for the corresponding one or more network entities in the corresponding network domain when the category associated with the one or more attributes indicates a categorical value.

In an embodiment, classifying one or more attributes in each of the one or more subnet slice profiles as configurable attributes for the corresponding one or more network entities in the corresponding network domain. Further, enforcing the one or more attributes categorized as the configurable attributes in each of the one or more subnet slice profiles by the network entity for configuring the subnet slice profile.

In an embodiment, providing the one or more attributes classified as the non-configurable attributes in each of the one or more subnet slice profiles to the corresponding one or more network entities. Further, enforcing the non-configurable attributes in each of the one or more subnet slice profiles by the network entity.

In an embodiment, the network entity comprises at least one of an Operation and Management (OAM) entity.

In an embodiment, determining the root slice profile comprises translating each of the one or more attributes in the Service Profile into the corresponding one or more attributes in the root slice profile based on a nomenclature using in the root slice profile.

In an embodiment, the one or more attributes comprises at least one of an area of service, an energy efficiency, a maximum number of users supported, an Uplink/Downlink throughput, a support for mission critical, and a maximum number of Protocol Data Unit (PDU) sessions per network slice.

In an embodiment, the method comprises computing a Key Performance Indicator (KPI) associated with the maximum number of PDU sessions per network slice when the one or more attributes is the maximum number of PDU sessions per network slice.

In an embodiment, computing a Key Performance Indicator (KPI) associated with the maximum number of PDU sessions per network slice when the one or more attributes is the maximum number of PDU sessions per network slice, comprises averaging a count of successful PDU session establishment procedures completed with the Session Management Functions (SMFs), wherein the PDU sessions are related to a network slice.

In an embodiment, generating the one or more subnet slice profiles comprises adding each of the one or more attributes in the root slice profile to the one or more subnet slice profiles based on a pre-defined mapping, wherein the pre-defined mapping indicates a relevance of the one or more attributes with the one or more network entities.

In an embodiment, the one or more subnet slice profiles comprises a core network slice profile, a radio access network slice profile, an edge network slice profile, and a transport network slice profile.

In an embodiment, the configurable attributes are enforced by network entity at the runtime and non-configurable attributes are enforced by the network entity at the time of subnet slice creation.

In an embodiment, enforcing the configurable attributes comprises configuring, by the one or more network entities, a value associated with the one or more attributes categorized as the configurable attributes in the corresponding one or more subnet slice profiles during provisioning of the network slice.

In an embodiment, enforcing the configurable attributes including a downlink throughput per network slice.guranteed comprises configuring a User Plane Function (UPF) with an entire quota available (i.e., minDlThptPerSlice) when the network slice comprises a single UPF. Alternatively, partitioning a total available downlink throughput equally based on count of a plurality of UPFs when the network slice comprises the plurality of UPFs. Alternatively, partitioning a total available downlink throughput based on a present and projected network traffic for each UPF from the plurality of UPFs when the network slice comprises the plurality of UPFs. Further, configuring each of the UPFs from the plurality of UPFs with a minimum downlink throughput per slice (i.e. minDlThptPerSlice) using a modifyMOIAttributes operation.

an embodiment, enforcing the configurable attributes including a uplink throughput per network slice.guranteed comprises configuring a User Plane Function (UPF) with an entire quota available (i.e., minUlThptPerSlice) when the network slice comprises a single UPF. Alternatively, partitioning a total available uplink throughput equally based on count of a plurality of UPFs when the network slice comprises the plurality of UPFs. Alternatively, partitioning a total available uplink throughput based on a present and projected network traffic for each UPF from the plurality of UPFs when the network slice comprises the plurality of UPFs. Further, configuring each of the UPFs from the plurality of UPFs with a minimum uplink throughput per slice (i.e. minUlThptPerSlice) using a modifyMOIAttributes operation.

In an embodiment, enforcing the configurable attributes including a number of terminals comprises configuring an Access Management Function (AMF) with an entire quota available (i.e. a total number of User Equipment's (UEs)) when the network slice comprises a single AMF. Alternatively, partitioning a total number of UEs equally based on count of a plurality of AMFs when the network slice comprises the plurality of AMFs. Alternatively, partitioning a total number of UEs based on a present and projected number of UEs when the network slice comprises the plurality of AMFs. Further, configuring each of the AMFs from the plurality of AMFs with maximum number of UEs per slice (i.e. number of terminals) using a modifyMOIAttributes operation.

In an embodiment, enforcing the configurable attributes including a number of connections comprises configuring a Session Management Function (SMF) with an entire quota available (i.e. a total number of PDU sessions) when the network slice comprises a single SMF. Alternatively, partitioning a total number of PDU sessions equally based on count of a plurality of SMFs when the network slice comprises the plurality of SMFs. Alternatively, partitioning a total number of UEs based on a present and projected subscription number when the network slice comprises the plurality of SMFs. Further, configuring each of the SMFs from the plurality of SMFs with maximum number of PDU sessions per slice (i.e. number of connections) using a modifyMOIAttributes operation.

In an embodiment, enforcing the non-configurable attributes comprises receiving, by a Network Slice Management Function (NSMF) associated with an OAM entity, an allocateNSI request with slice requirements. Further, obtaining, by the NSMF, a subnet slice requirement from the allocateNSI request with slice requirements. Furthermore, sending, by the NSMF, the allocateNSSI request with subnet slice requirement to a Network Slice Subnet Management Function (NSSMF) associated with the OAM entity. Thereafter, performing, by the NSSMF, a feasibility check of the subnet slice requirement with pre-defined subnet slice stored in a database associated with the NSSMF. Subsequently, sending, by the NSMF, an AllocateNSI response when the feasibility check is successful.

Accordingly, embodiments herein disclose an Operation and Management (OAM) entity for configuring a subnet slice profile in a Fifth Generation (5G) network. The OAM entity comprises a memory, a processor, and a GST controller communicatively coupled with the memory and the processor. The GST controller is configured to determine a root slice profile from a Service Profile, wherein the Service Profile comprises one or more attributes associated with a Global System for Mobile Communications (GSMA) Generic Network Slice Template (GST). Further, the GST controller is configured to generate one or more subnet slice profiles associated with corresponding one or more network domains of the 5G network from the root slice profile. Furthermore, the GST controller is configured to determine from the one or more attributes (501), the attributes relevant for the generated subnet slice profile. Finally, the GST controller is configured to enforce the relevant attributes for configuring the subnet slice profile.

In an embodiment, a method performed by a network entity in a communication system, the method comprising: identifying a service profile based on a list of generic network slice template (GST) attributes; identifying a first slice profile associated with a first domain and a second slice profile associated with a second domain based on the service profile, wherein first requirements associated with the first domain are in the first slice profile and second requirements associated with the second domain are in the second slice profile; identifying first configurable parameters associated with network function (NF) behavior for the first domain based on the first requirements; and identifying second configurable parameters associated with NF behavior for the second domain based on the second requirements.

In an embodiment, the first domain is a core network and the second domain is a radio access network.

In an embodiment, identifying the first slice profile and the second slice profile further comprising: identifying third requirements associated with a third domain based on the service profile and the third domain is a transport network.

In an embodiment, the method further comprises: identifying a root slice profile based on the service profile, wherein requirements corresponding to service requirements in the service profile are in the root slice profile, and wherein the first slice profile, the second slice profile, and the third requirements are identified based on the root slice profile.

In an embodiment, at least one requirement which is not translated to the first configurable parameters among the first requirements is used for network slice behavior and at least one requirement which is not translated to the second configurable parameters among the second requirements is used for network slice behavior.

In an embodiment, at least one of a number of user equipments (UEs) or a number of connections associated with protocol data unit (PDU) sessions is in the list of the GST attributes. The number of the UEs and the number of the connections are translated to a maximum number of the UEs and a maximum number of the PDU sessions in the service profile, the maximum number of the UEs is in the first slice profile and the second slice profile, and the maximum number of the PDU sessions is in the first slice profile.

In an embodiment, the maximum number of the UEs in the first slice profile is translated to one of the first configurable parameters, the maximum number of the UEs in the second slice profile is translated to one of the second configurable parameters, and the maximum number of the PDU session in the first slice profile is translated to one of the first configurable parameters.

In an embodiment, key performance indicator (KPI) is associated with the maximum number of the PDU sessions, and the KPI is determined based on successful PDU session establishment procedures of session management functions (SMFs) which is associated with a network slice.

In an embodiment, a network entity in a communication system is provided. The network entity comprising: transceiver; and a controller coupled with the transceiver and configured to: identify a service profile based on a list of generic network slice template (GST) attributes, identify a first slice profile associated with a first domain and a second slice profile associated with a second domain based on the service profile, wherein first requirements associated with the first domain are in the first slice profile and second requirements associated with the second domain are in the second slice profile, identify first configurable parameters associated with network function (NF) behavior for the first domain based on the first requirements, and identify second configurable parameters associated with NF behavior for the second domain based on the second requirements.

In an embodiment, the first domain is a core network and the second domain is a radio access network.

In an embodiment, the controller is further configured to identify third requirements associated with a third domain based on the service profile and the third domain is a transport network.

In an embodiment, the controller is further configured to identify a root slice profile based on the service profile, wherein requirements corresponding to service requirements in the service profile are in the root slice profile, and wherein the first slice profile, the second slice profile, and the third requirements are identified based on the root slice profile.

In an embodiment, at least one requirement which is not translated to the first configurable parameters among the first requirements is used for network slice behavior and at least one requirement which is not translated to the second configurable parameters among the second requirements is used for network slice behavior.

In an embodiment, at least one of a number of user equipments (UEs) or a number of connections associated with protocol data unit (PDU) sessions is in the list of the GST attributes. The number of the UEs and the number of the connections are translated to a maximum number of the UEs and a maximum number of the PDU sessions in the service profile, the maximum number of the UEs is in the first slice profile and the second slice profile and the maximum number of the PDU sessions is in the first slice profile.

In an embodiment, the maximum number of the UEs in the first slice profile is translated to one of the first configurable parameters, the maximum number of the UEs in the second slice profile is translated to one of the second configurable parameters, and the maximum number of the PDU session in the first slice profile is translated to one of the first configurable parameters.

In an embodiment, key performance indicator (KPI) is associated with the maximum number of the PDU sessions, and the KPI is determined based on successful PDU session establishment procedures of session management functions (SMFs) which is associated with a network slice.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

According to the embodiments of the disclosure, a system and method for configuring a slice profile in a Fifth Generation (5G) network is provided.

According to an embodiment of the disclosure, a method and an apparatus for classifying Global System for Mobile Communications (GSMA) Generic Network Slice Template (GST) attributes into one of a configurable attribute and a non-configurable attribute are provided.

According to an embodiment of the disclosure, an enforcement technique for the configurable attributes and non-configurable attributes is provided.

According to an embodiment of the disclosure, a method and an apparatus for computing a Key Performance Indicator (KPI) for the GST attribute including a maximum number of PDU sessions per network slice are provided.

According to an embodiment of the disclosure, a method and an apparatus for generating multiple slice profile for subnet slice corresponding to each of the one or more network domains of the 5G network are provided.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 6A is a schematic diagram illustrating the list of Generic Network Slice Template (GST) attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6B is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6C is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6D is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6E is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6F is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6G is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6H is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

FIG. 6I is a schematic diagram illustrating the list of GST attributes in a service profile, a category of the GST attributes, GST attributes in the Slice Profile(s), a classification of the GST attributes as one of configurable attributes or non-configurable attributes, a configuring and enforcing entities, and a configuration parameters, according to embodiments as disclosed herein;

MODE FOR THE INVENTION

Figure 1:
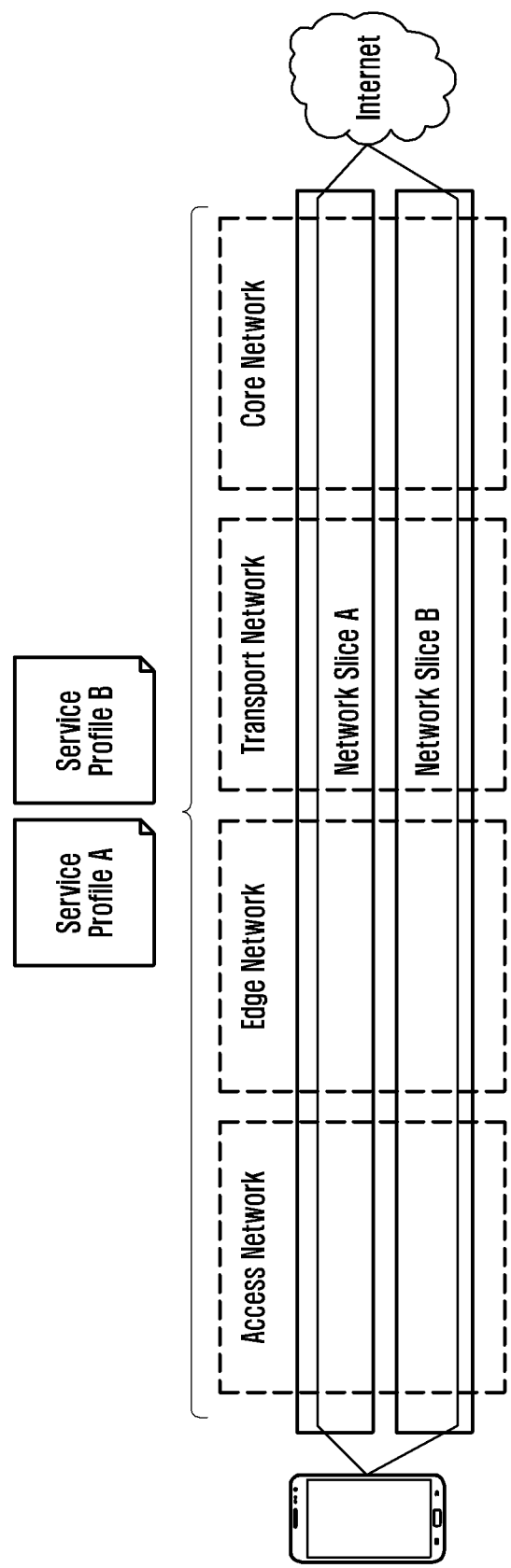
FIG. 1 is a schematic diagram illustrating a usage of translated Global System for Mobile Communications (GSMA) Generic Network Slice Template (GST) as input to service profile, according to a prior art.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Referring to the drawings, and more particularly to FIGS. 2 through 11 there are shown preferred embodiments.

Figure 2:
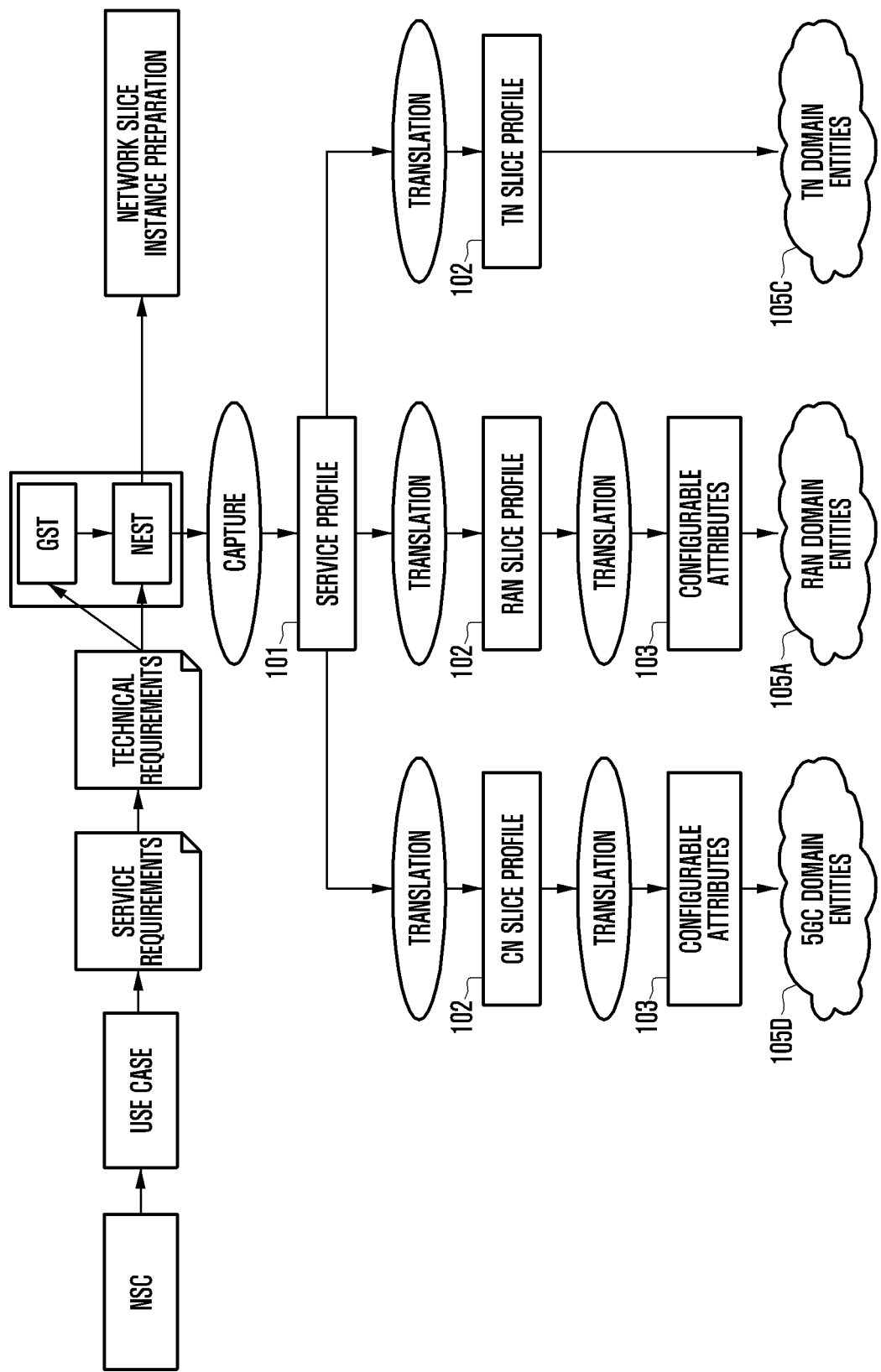
FIG. 2 illustrates a schematic diagram for configuring a network slice in a Fifth Generation (5G) network, according to embodiments as disclosed herein.
Figure 3:
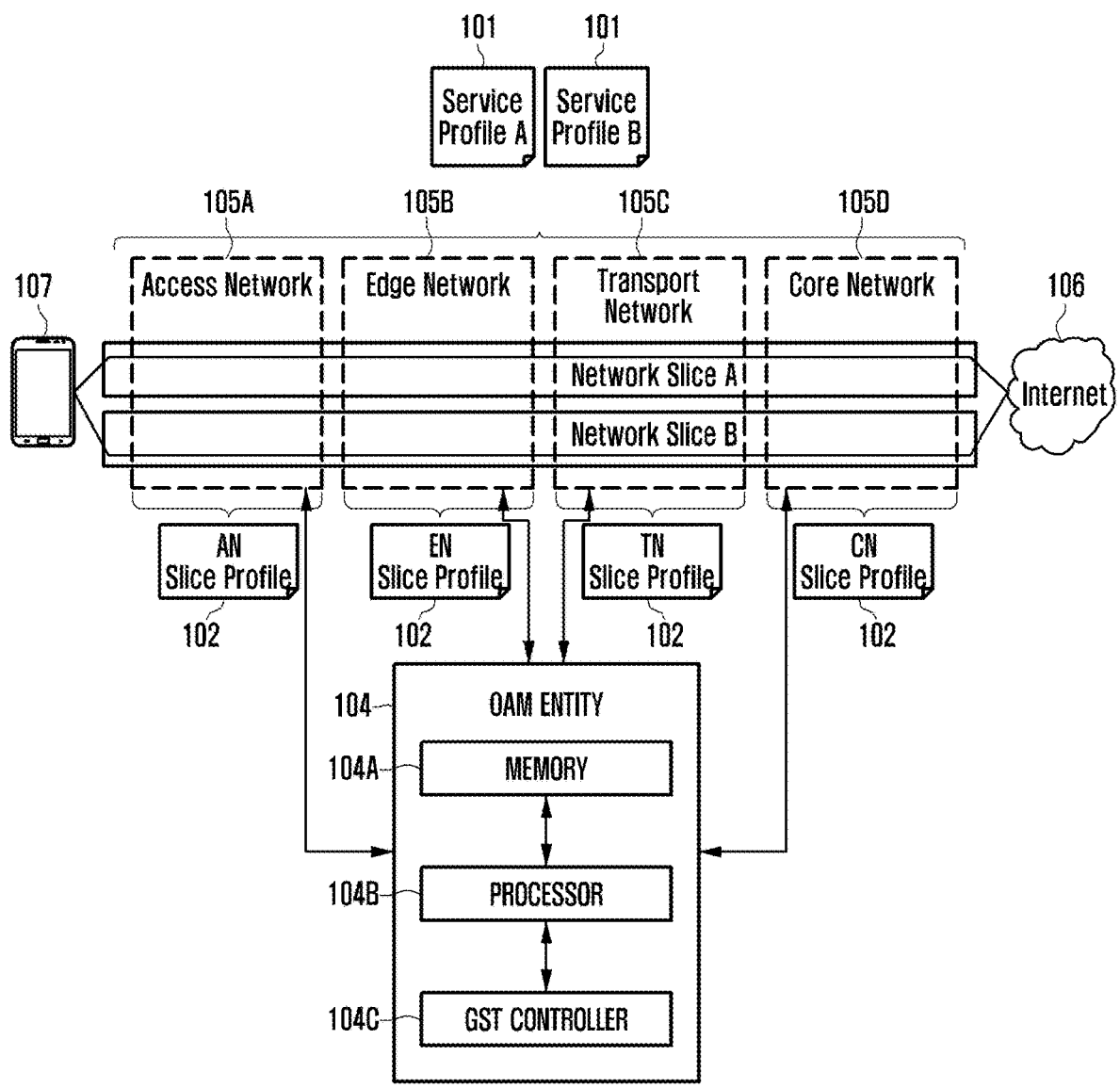
FIG. 3 illustrates a schematic diagram for configuring a network slice in a 5G network, according to embodiments as disclosed herein.

FIG. 2 and FIG. 3 illustrates a schematic diagram for configuring a network slice in a Fifth Generation (5G) network, according to embodiments as disclosed herein.

In one implementation, a Network Slice Customer (NSC) such as user equipment (107) based on a use case provides the service requirements and technical requirements for a network slice to an OAM entity (104) associated with a network operator or a Network Slice Provider (NSP). For example, the UE (107) may request two network slices (i.e., network slice A and B) based on the use case as shown in FIG. 3. Further, a Generic Network Slice Template (GST) comprising a set of attributes that characterize a type of network slice is used to convert the service requirements and/or technical requirements into set of attributes. The set of attributes may be denoted using a service profile (101). For example, a service profile A (101) and a service profile B (101) corresponding to the network slice A and network slice B is as shown in FIG. 3. Furthermore, a Network Slice Type (NEST) is generated that comprises the GST filled with values. The values are assigned to express a given set of service requirements and/or technical requirements to support the NSC use case. The NEST is used as input to the network slice preparation as shown in FIG. 2.

In an embodiment, the OAM entity (104) comprises a memory (104A), a processor (104B) and a GST controller (104C) communicatively coupled with the memory (104A) and the processor (104B). The OAM entity (104) comprises at least one of a core network entity (105), a radio access network entity (105), an edge network entity (105), a transport network entity (105), a Network Function Management Function (NFMF) as a Provisioning MnsProducer, NSMS_Producer, NSSMS_Producer and the like. Further, the OAM entity (104) may be implemented as at least one of a remote server in the 5G network, and a distributed server among the one or more network domains of the 5G network. The one or more network domains may include at least one of an access network (105A) or Radio access network, an edge network (105B), a transport network (105C), and a core network (105D). The memory (104A) is configured to store the service profile (101) corresponding to the network slice, one or more subnet slice profiles (102) corresponding to one or more network domains of the 5G network, and the like. The processor (104B) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (104B) may include multiple cores to execute the instructions. Further, the GST controller (104C) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the service profile (101) associated with the network slice is captured from the NEST as shown in FIG. 2. Further, the OAM entity (104) is configured to determine a root slice profile from a Service Profile (101). The root slice profile denotes the service profile (101) with a nomenclature corresponding to the network service provider. Further, the OAM entity (104) is configured to generate one or more subnet slice profiles (102) from the root slice profile. The one or more subnet slice profiles (102) are associated with the corresponding one or more network domains of the 5G network. For example, the one or more subnet slice profiles (102) including an Access Network (AN) slice profile (102) or a Radio Access Network (RAN) slice profile (102), an Edge Network (EN) slice profile (102), a Transport Network slice profile (102) and a Core Network (CN) slice profile (102) is generated corresponding to the one or more network domains of the 5G network as shown in FIG. 2 and FIG. 3. For example, a Core Network (CN) slice profile (102) is used to carry Core network domain requirements, a Radio Access Network (RAN) slice profile (102) is used to carry RAN domain requirements, a Transport Network (TN) slice profile (102) is used to carry transport domain requirements and the like.

In an embodiment, the OAM entity (104) is configured to classify one or more attributes in each of the one or more subnet slice profiles (102) as configurable attributes (103) with as shown in FIG. 2. In another embodiment the OAM entity (104) is configured to classify one or more attributes in each of the one or more subnet slice profiles (102) as non-configurable attributes. The configurable attributes (103) includes at least one of a performance attribute, and a quality attribute. The Performance attribute relates to Key Performance Indication (KPI) such as a Downlink (DL) or Uplink (UL) throughput. The quality attribute relates to quality of service parameters such as packet loss, packet delay variation, jitter, and the like. The non-configurable attributes includes at least one of a coverage attribute, and a feature attribute. The coverage attribute relates to attributes that restrict a service accessibility. The feature attribute indicates the supportability of various functionalities on the network slice.

In an embodiment, the OAM entity (104) is configured to provide the configurable attributes (103) to the corresponding one or more network entities (105) in the corresponding network domain. The one or more entities is used herein to denote various network functions of a 5GS as defined in the 3GPP. The configurable attributes (103) are translated into configuration parameters (i.e., values) and are enforced by the one or more network entities (105) at a run-time. Further, the OAM entity (104) is configured to provide the Non-Configurable Attributes to the corresponding one or more OAM entities in the corresponding network domain. The non-configurable attributes remains at NSMF or NSSMF level as required slice feature or capabilities and are enforced by the NSMF or NSSMF during slice provisioning.

Figure 4:
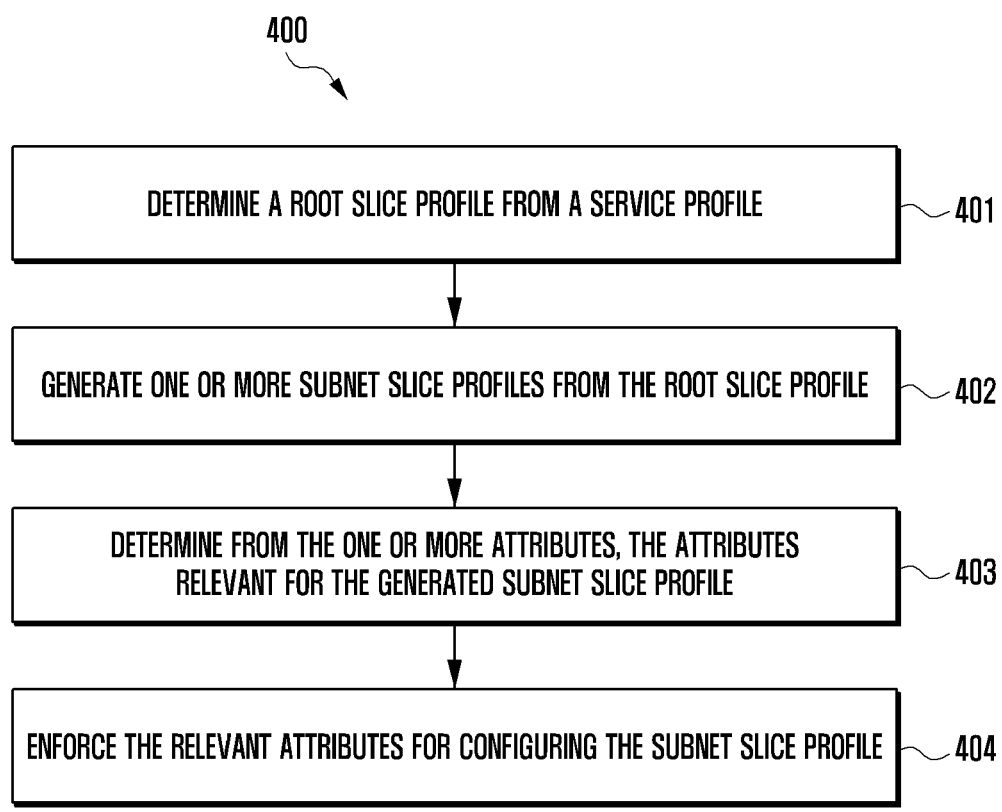
FIG. 4 shows a flowchart illustrating the method steps for configuring a slice profile in a Fifth Generation (5G) network, according to embodiments disclosed herein.

FIG. 4 shows a flowchart illustrating the method steps for configuring a slice profile in a Fifth Generation (5G) network, according to embodiments disclosed herein.

At the step 401, the method comprises determining a root slice profile from a Service Profile (101), wherein the Service Profile (101) comprises one or more attributes associated with a Global System for Mobile Communications (GSMA) Generic Network Slice Template (GST).

In an embodiment, the one or more attributes comprises at least one of an area of service, an energy efficiency, a maximum number of users supported, an Uplink/Downlink throughput, a support for mission critical, and a maximum number of Protocol Data Unit (PDU) sessions per network slice.

Figure 5:
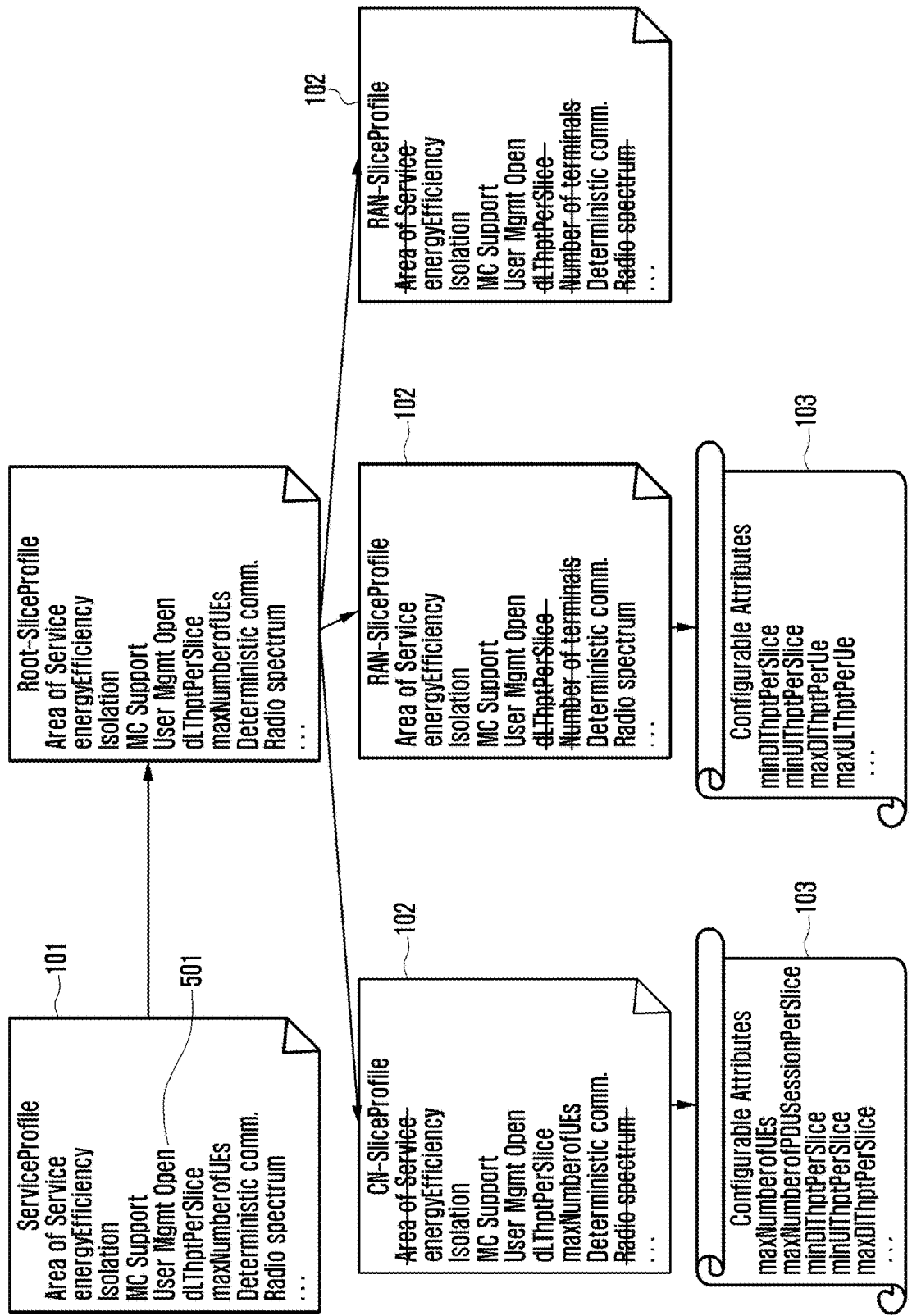
FIG. 5 is a schematic diagram illustrating a translation of a Service Profile into Slice Profile(s) and classification of configurable attributes in the Slice Profile(s), according to embodiments as disclosed herein.

In an embodiment, determining the root slice profile comprises translating each of the one or more attributes (501) in the Service Profile (101) into the corresponding one or more attributes (501) in the root slice profile based on a nomenclature using in the root slice profile as shown in FIG. 5. For example, a list of 56 GST attributes and the corresponding nomenclature used in the service profile (101) and the root slice profile is shown in FIGS. 6A to 6I in the columns names "GST Attributes", "Service Profile", and "Root Slice Profile".

At the step 402, the method comprises generating one or more subnet slice profiles (102) associated with corresponding one or more network domains of the 5G network from the root slice profile.

In an embodiment, the one or more subnet slice profiles (102) comprises a core network slice profile, a radio access network slice profile, an edge network slice profile, and a transport network slice profile.

In an embodiment, generating one or more subnet slice profiles (102) comprises adding each of the one or more attributes (501) in the root slice profile to the one or more subnet slice profiles (102) based on a pre-defined mapping, wherein the pre-defined mapping indicates a relevance of the one or more attributes (501) with the one or more network entities (105) as shown in FIG. 5. The pre-defined mapping is stored in the memory (104A) of the OAM entity (104). In one embodiment, the pre-defined mapping may include for example, a TAC—Tracking Area Code, a MTU—Maximum Transmission Unit to which the one or more attributes (501) maps and the corresponding one or more network entities (105) such as Access and Mobility Management Function (AMF), a Next Generation NodeB (gNB), evolvedNodeB (eNB), and the like in the one or more network domain.

In an embodiment, the pre-defined mapping may include a one or more network domains relevant for each of the one or more attributes (501). For example, consider the attribute "Radio Spectrum" in the root slice profile that indicates a range of frequency of operation, then the attribute "Radio Spectrum" is relevant for the RAN slice profile (102) and not relevant for the CN slice profile (102) and the TN slice profile (102) as shown in FIG. 5, because the range of frequency of operation (i.e. "Radio Spectrum" is used by the base station or eNB, or a gNB associated with the Radio Access Network (105A). The one or more attributes (501) not relevant to the one or more network domains is denoted by a strikethrough in the one or more subnet slice profiles (102).

In an embodiment, the one or more attributes (501) may be associated with one or more than one slice profiles (102). In a first example, the attribute "grpCommSupport" in the root slice profile is translated into "grpCommSupport" in CN Slice Profile (102) only based on the pre-defined mapping as shown in FIGS. 6A to 6I. In a second example, the attribute "serviceContinuity" is translated into "servicecontinuity" in CN, RAN and TN Slice Profiles (102) based on the pre-defined mapping as shown in FIGS. 6A to 6I.

For example, the list of 56 GST attributes and the presence or the absence of the 56 GST attributes in the one or more subnet slice profiles (102) is as shown in FIGS. 6A to 6I, where the absence of the one or more attributes (501) is denoted by a "-" (Hyphen or dash symbol) based on the pre-defined mapping.

At the step 403, the method comprises determining from the one or more attributes (501), the attributes relevant for the generated subnet slice profile (102).

In an embodiment, determining the relevant attributes comprises classifying one or more attributes (501) in each of the one or more subnet slice profiles (102) as configurable attributes (103) for the corresponding one or more network entities (105) in the corresponding network domain.

In an embodiment, classifying one or more attributes (501) comprises identifying a category associated with each of the one or more attributes (501) in the one or more subnet slice profiles (102) as shown in FIGS. 6A to 6I. The category comprises at least one of a performance, a quality, a coverage and a feature as shown in FIGS. 6A to 6I. Further, the one or more attributes (501) are classified as the configurable attributes (103) when the category associated with the one or more attributes (501) indicates a quantifiable value. For example, consider the attribute "number of connections" with the category as "Performance", then the attribute "number of connections" is classified as the configurable attribute (103) as denoted in the sub-category column in FIGS. 6A to 6I, because the attribute "number of connections" indicates the quantifiable value such as 50 connections, 100 connections and the like. In one embodiment, the categories including the performance and/or the quality may be used to denote the quantifiable value for the one or more attributes (501).

For example, the one or more attributes (501) in the CN slice profile (102) and the RAN slice profile (102) classified as the configurable attributes (103) is as shown in FIG. 5.

In an embodiment, the method comprises classifying one or more attributes (501) in each of the one or more subnet slice profiles (102) as non-configurable attributes for the corresponding one or more network entities (105) in the corresponding network domain.

In an embodiment, classifying one or more attributes (501) comprises identifying a category associated with each of the one or more attributes (501) in the one or more subnet slice profiles (102) as shown in FIGS. 6A to 6I. The category comprises at least one of a performance, a quality, a coverage and a feature as shown in FIGS. 6A to 6I. Further, the one or more attributes (501) are classified as the non-configurable attributes when the category associated with the one or more attributes (501) indicates a categorical value. For example, consider the attribute "Mission Critical Support", with the category as "Feature", then the attribute "Mission Critical Support" is classified as the non-configurable attribute as denoted in the sub-category column in FIGS. 6A to 6I, because the attribute "Mission Critical Support" indicates the categorical value such as "yes" or "no". In one embodiment, the categories including the feature and/or the coverage may be used to denote the categorical value for the one or more attributes (501).

At the step 403, the method comprises enforcing the relevant attributes for configuring the subnet slice profile (102).

In an embodiment, the enforcing the attributes comprises providing the one or more attributes (501) categorized as the configurable attributes (103) in each of the one or more subnet slice profiles (102) to the corresponding one or more network entities (105) in the corresponding network domain for enforcing the configurable attributes (103).

In an embodiment, configurable attributes (103) are enforced by configuring a value (i.e., configuration parameter) associated with the one or more attributes (501) categorized as the configurable attributes (103) in the corresponding one or more subnet slice profiles (102) during provisioning of the network slice.

In an embodiment, the configurable attributes (103) in each of the one or more subnet slice profiles (102) will be translated into configuration parameter corresponding to the one or more network entities (105) in the corresponding network domain as shown in FIGS. 6A to 6I. Further, the configurable attributes (103) are enforced by the corresponding one or more network entities (105) denoted by enforcing NF as shown in FIGS. 6A to 6I during a runtime. For example, the GST attribute "number of terminals" which is translated as "maxNumofUEs" in the subnet slice is further translated into configuration parameter indicating an integer value for the AMF and enforced by the AMF as shown in FIGS. 6A to 6I.

Figure 7A:
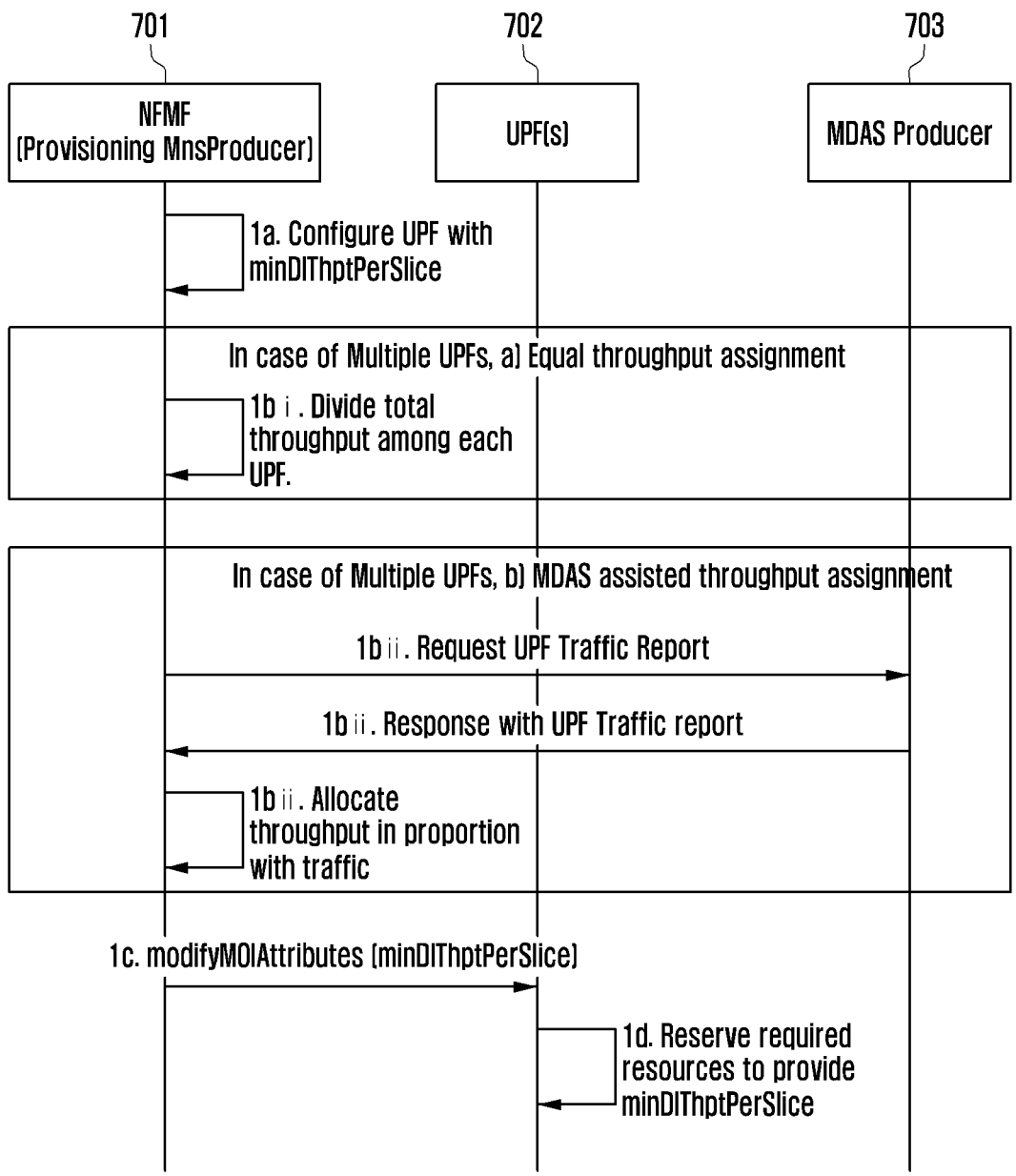
FIG. 7A is a schematic diagrams illustrating the configuration and enforcement procedures for GST attribute "downlink throughput per network slice: guaranteed", according to embodiments as disclosed herein.
Figure 7B:
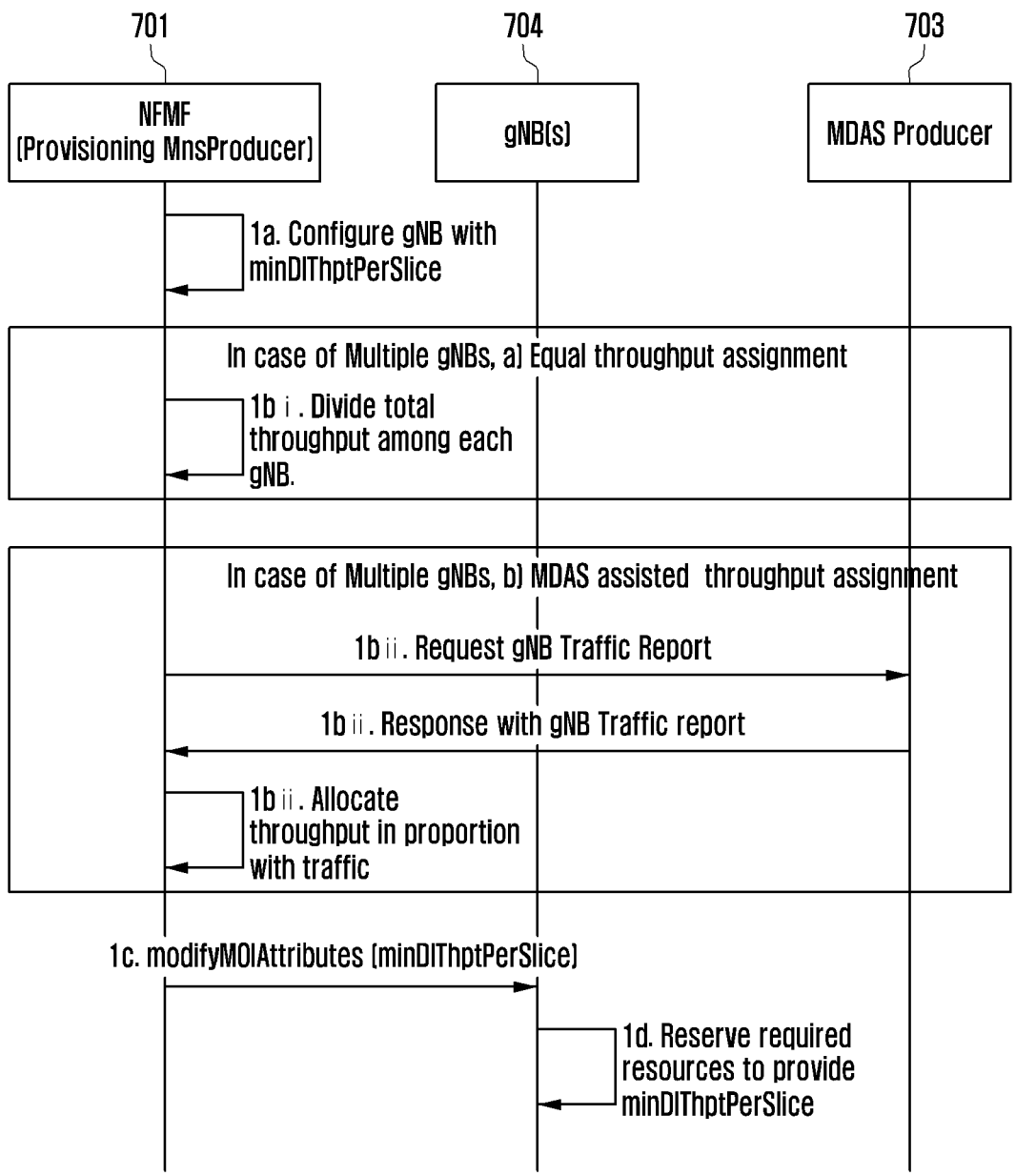
FIG. 7B is a schematic diagrams illustrating the configuration and enforcement procedures for GST attribute "downlink throughput per network slice: guaranteed", according to embodiments as disclosed herein.

In an embodiment, consider the GST attribute "Downlink throughput per network slice-guaranteed", the configuration and enforcement of the GST attribute at the time of provisioning the network slice is as shown in FIG. 7A and FIG. 7B. The NFMF acting as the provisioning MnS producer (701) (i.e., an OAM entity (104)) is configured to derive minimum downlink throughput for User Plane Function (UPF(s)) per network slice. When the network slice comprises a single UPF, the provisioning MnS producer (701) configures the UPF (702) with an entire quota available (i.e., minDlThptPerSlice) as shown in signal 1.a of FIG. 7A.

Alternatively, when the network slice comprises a plurality of UPFs, the provisioning MnS producer (701) partitions (i.e., divides) a total available downlink throughput equally to the plurality of UPFs (702) based on count of a plurality of UPFs (702) as shown in signal 1.b.i of FIG. 7A.

In another embodiment, when the network slice comprises a plurality of UPFs, the provisioning MnS producer (701) sends a request to a Management Data Analytics Service (MDAS) producer for a traffic report associated with a plurality of UPFs (702) as shown in signal 1.b.ii of FIG. 7A. Further, the provisioning MnS producer (701) receives a response with UPF(s) (702) traffic report from the MDAS producer (703) as shown in signal 1.b.ii of FIG. 7A. Furthermore, the provisioning MnS producer (701) partitions the total available downlink throughput to the plurality of UPFs (702) based on a present and projected network traffic for each UPF (702) as shown in signal 1.b.ii of FIG. 7A. For example, the provisioning MnS producer (701) divides the total available minimum downlink throughput among the plurality of UPFs (702) in proportion with the traffic projections.

In an embodiment, the provisioning MnS producer (701) configures each of the UPFs (702) from the plurality of UPFs (702) as shown in signal 1.*c* of FIG. 7A with a minimum downlink throughput per slice (i.e. minDlThptPerSlice) using a modifyMOIAttributes operation as defined in 3GPP TS 28.532. Further, the plurality of UPFs (702) will reserve required resources for the network slice to provide minimum downlink throughput per slice as shown in signal 1.*d* of FIG. 7A.

The provisioning MnS producer (701) (i.e., an OAM entity (104)) is configured to decide minimum downlink throughput for gNBs (704) per network slice. When the network slice comprises a single gNB, the provisioning MnS producer (701) configures the gNB (704) with an entire quota available (i.e., minDlThptPerSlice) as shown in signal 1.*a* of FIG. 7B.

Alternatively, when the network slice comprises a plurality of gNBs, the provisioning MnS producer (701) partitions (i.e., divides) a total available downlink throughput equally to the plurality of gNBs (704) based on count of a plurality of UPFs (702) as shown in signal 1.*b.i* of FIG. 7B.

In another embodiment, when the network slice comprises a plurality of gNBs, the provisioning MnS producer (701) sends a request to a Management Data Analytics Service (MDAS) producer for a traffic report associated with a plurality of gNBs (704) as shown in signal 1.*b.ii* of FIG. 7B. Further, the provisioning MnS producer (701) receives a response with gNB(s) (704) traffic report from the MDAS producer (703) as shown in signal 1.*b.ii* of FIG. 7B. Furthermore, the provisioning MnS producer (701) partitions the total available downlink throughput to the plurality of gNBs (704) based on a present and projected network traffic for each gNB (704) as shown in signal 1.*b.ii* of FIG. 7B. For example, the provisioning MnS producer (701) divides the total available minimum downlink throughput among the plurality of gNBs (704) in proportion with the traffic projections.

In an embodiment, the provisioning MnS producer (701) configures each of the gNBs (704) from the plurality of gNBs (704) as shown in signal 1.*c* of FIG. 7B with a minimum downlink throughput per slice (i.e. minDlThptPerSlice) using a modifyMOIAttributes operation as defined in 3GPP TS 28.532. Further, the plurality of gNBs (704) will reserve required resources for the network slice to provide minimum downlink throughput per slice as shown in signal 1.*d* of FIG. 7B.

Figure 8A:
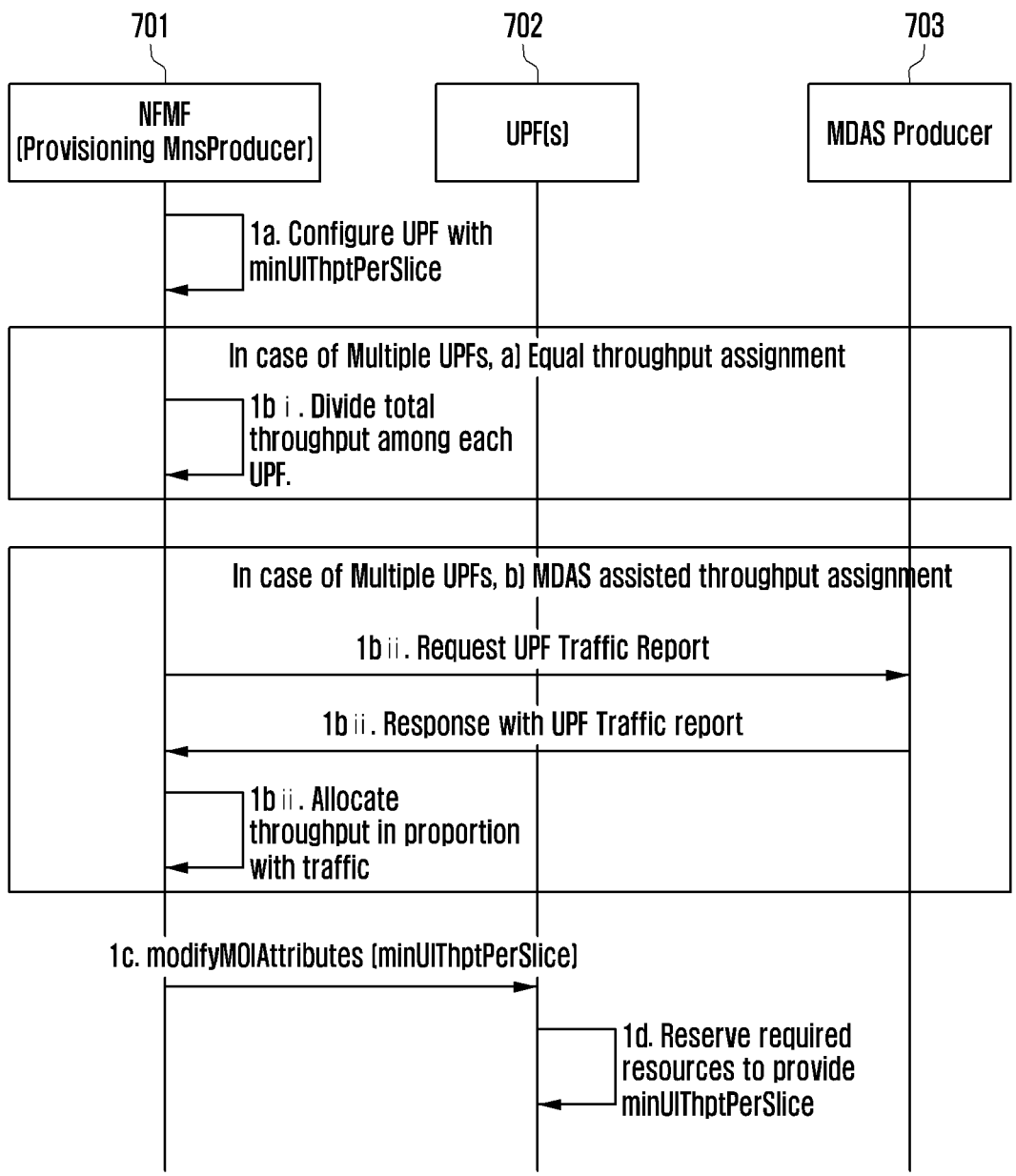
FIG. 8A is a schematic diagrams illustrating the configuration and enforcement procedures for GST attribute "uplink throughput per network slice: guaranteed", according to embodiments as disclosed herein.
Figure 8B:
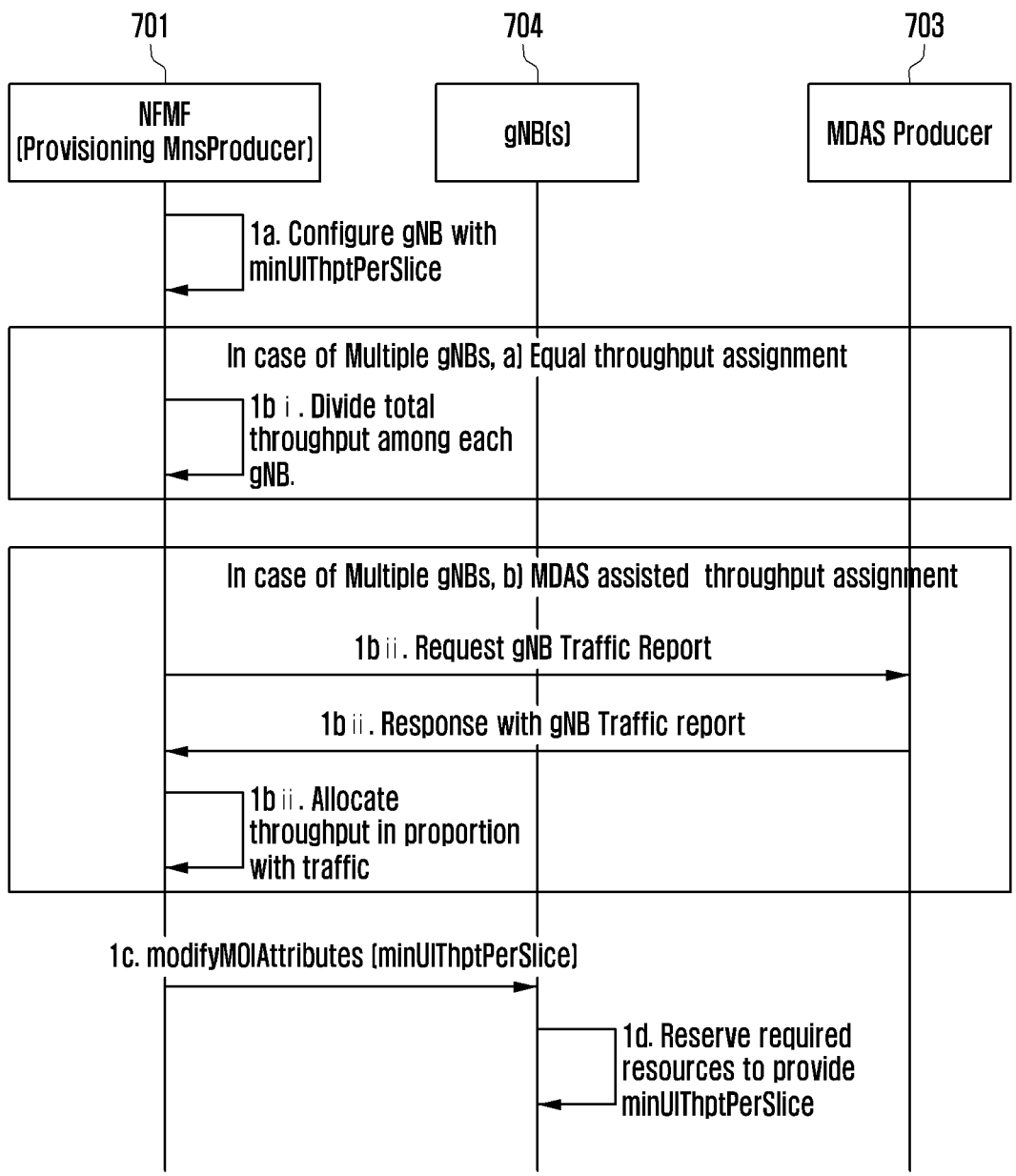
FIG. 8B is a schematic diagrams illustrating the configuration and enforcement procedures for GST attribute "uplink throughput per network slice: guaranteed", according to embodiments as disclosed herein.

In an embodiment, consider the GST attribute "Uplink throughput per network slice-guaranteed", the configuration and enforcement of the GST attribute at the time of provisioning the network slice is as shown in FIG. 8A and FIG. 8B. The provisioning MnS producer (701) (i.e., an OAM entity (104)) is configured to decide minimum uplink throughput for User Plane Function (UPF(s)) per network slice. When the network slice comprises a single UPF, the provisioning MnS producer (701) configures the UPF (702) with an entire quota available (i.e., minUlThptPerSlice) as shown in signal 1.*a* of FIG. 8A.

Alternatively, when the network slice comprises a plurality of UPFs, the provisioning MnS producer (701) partitions (i.e., divides) a total available uplink throughput equally to the plurality of UPFs (702) based on count of a plurality of UPFs (702) as shown in signal 1.*b.i* of FIG. 8A.

In another embodiment, when the network slice comprises a plurality of UPFs, the provisioning MnS producer (701) sends a request to a Management Data Analytics Service (MDAS) producer for a traffic report associated with a plurality of UPFs (702) as shown in signal 1.*b.ii* of FIG. 8A. Further, the provisioning MnS producer (701) receives a response with UPF(s) (702) traffic report from the MDAS producer (703) as shown in signal 1.*b.ii* of FIG. 8A. Furthermore, the provisioning MnS producer (701) partitions the total available uplink throughput to the plurality of UPFs (702) based on a present and projected network traffic for each UPF (702) as shown in signal 1.*b.ii* of FIG. 8A. For example, the provisioning MnS producer (701) divides the total available minimum uplink throughput among the plurality of UPFs (702) in proportion with the traffic projections.

In an embodiment, the provisioning MnS producer (701) configures each of the UPFs (702) from the plurality of UPFs (702) as shown in signal 1.*c* of FIG. 8A with a minimum uplink throughput per slice (i.e. minUlThptPerSlice) using a modifyMOIAttributes operation based on the partitioning as defined in 3GPP TS 28.532. Further, the plurality of UPFs (702) will reserve required resources for the network slice to provide minimum uplink throughput per slice as shown in signal 1.*d* of FIG. 8A.

The provisioning MnS producer (701) (i.e., an OAM entity (104)) is configured to decide minimum uplink throughput for gNBs (704) per network slice as shown in FIG. 8B. When the network slice comprises a single gNB, the provisioning MnS producer (701) configures the gNB (704) with an entire quota available (i.e., minUlThptPerSlice) as shown in signal 1.*a* of FIG. 8B.

Alternatively, when the network slice comprises a plurality of gNBs, the provisioning MnS producer (701) partitions (i.e., divides) a total available uplink throughput equally to the plurality of gNBs (704) based on count of a plurality of UPFs (702) as shown in signal 1.*b.i* of FIG. 8B.

In another embodiment, when the network slice comprises a plurality of gNBs, the provisioning MnS producer (701) sends a request to a Management Data Analytics Service (MDAS) producer for a traffic report associated with a plurality of gNBs (704) as shown in signal 1.*b.ii* of FIG. 8B. Further, the provisioning MnS producer (701) receives a response with gNB(s) (704) traffic report from the MDAS producer (703) as shown in signal 1.*b.ii* of FIG. 8B. Furthermore, the provisioning MnS producer (701) partitions the total available uplink throughput to the plurality of gNBs (704) based on a present and projected network traffic for each gNB (704) as shown in signal 1.*b.ii* of FIG. 8B. For example, the provisioning MnS producer (701) divides the total available minimum uplink throughput among the plurality of gNBs (704) in proportion with the traffic projections.

In an embodiment, the provisioning MnS producer (701) configures each of the gNBs (704) from the plurality of gNBs (704) as shown in signal 1.*c* of FIG. 8B with a minimum uplink throughput per slice (i.e. minUlThptPerSlice) using a modifyMOIAttributes operation based on the partitioning as defined in 3GPP TS 28.532. Further, the plurality of gNBs (704) will reserve required resources for the network slice to provide minimum uplink throughput per slice as shown in signal 1.*d* of FIG. 8B.

Figure 9A:
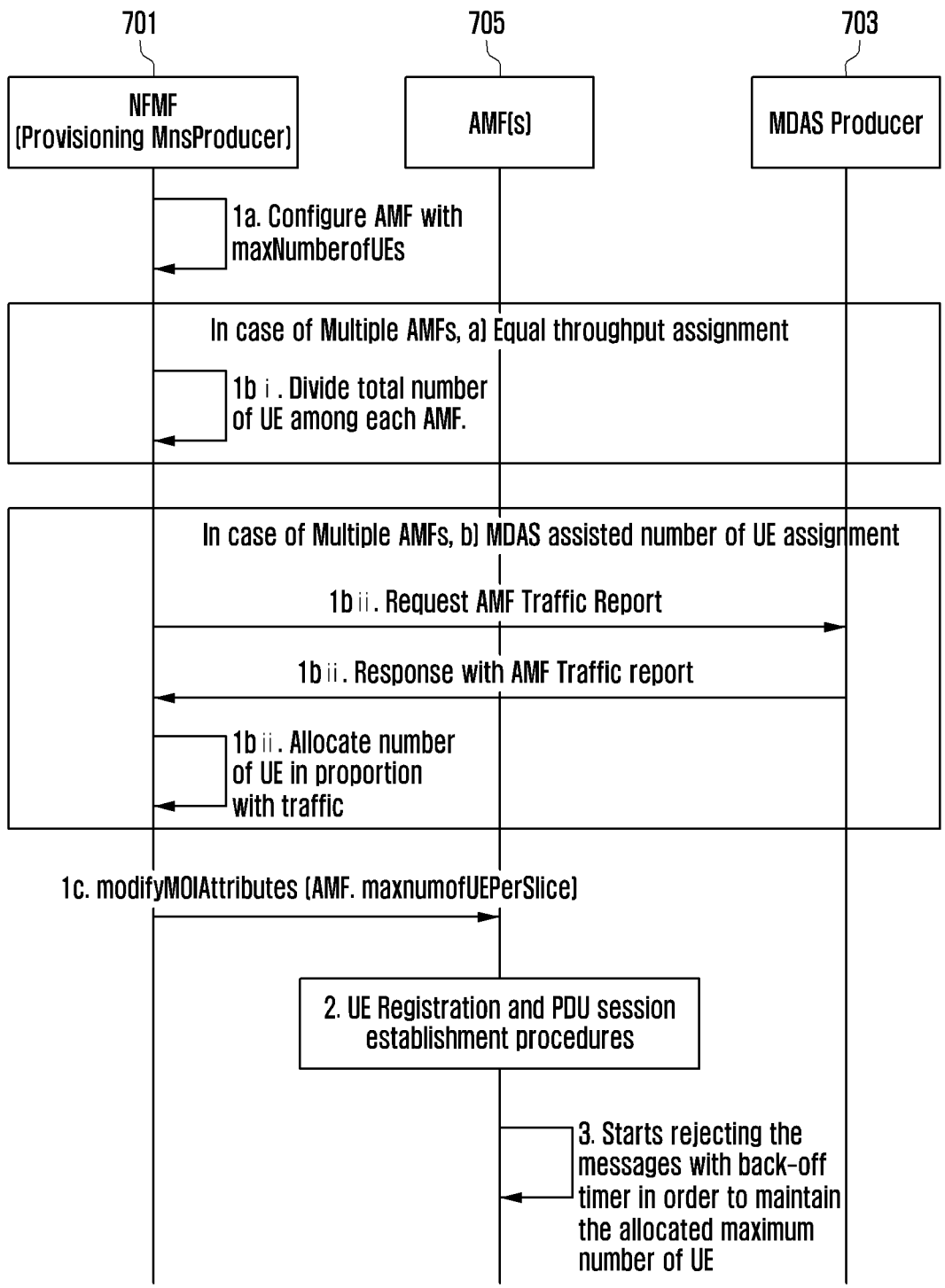
FIG. 9A is a schematic diagram illustrating the configuration and enforcement procedures for GST attribute "number of terminals", according to embodiments as disclosed herein.

In an embodiment, consider the GST attribute "number of terminals", the configuration and enforcement of the GST attribute at the time of provisioning the network slice is as shown in FIG. 9A. The provisioning MnS producer (701) (i.e., an OAM entity (104)) is configured to decide a number of terminals (i.e., a maximum number of UEs per network slice) for Access Management Function (AMF) per network slice. When the network slice comprises a single AMF, the provisioning MnS producer (701) configures the AMF (705)

with an entire quota available (i.e. a total number of User Equipment's (UEs)) as shown in signal 1.*a* of FIG. 9A.

Alternatively, when the network slice comprises a plurality of AMFs, the provisioning MnS producer (701) partitions (i.e., divides) a total number of UEs equally to the plurality of AMFs (705) based on count of a plurality of AMFs (705) as shown in signal 1.*b.i* of FIG. 9A.

In another embodiment, when the network slice comprises a plurality of AMFs, the provisioning MnS producer (701) sends a request to a Management Data Analytics Service (MDAS) producer for a traffic report associated with a plurality of AMFs (705) as shown in signal 1.*b.ii* of FIG. 9A. Further, the provisioning MnS producer (701) receives a response with AMF(s) (705) traffic report from the MDAS producer (703) as shown in signal 1.*b.ii* of FIG. 9A. Furthermore, the provisioning MnS producer (701) partitions the total number of UEs to the plurality of AMFs (705) based on a present and projected network traffic (i.e. UE numbers) for each AMF (705) as shown in signal 1.*b.ii* of FIG. 9A. For example, the provisioning MnS producer (701) divides the total number of UEs among the plurality of AMFs (705) in proportion with the traffic projections.

In an embodiment, the provisioning MnS producer (701) configures each of the AMFs (705) from the plurality of AMFs (705) as shown in signal 1.*c* of FIG. 9A with the number of terminals per slice (i.e. maximum number of UEs per slice) using a modifyMOIAttributes operation based on the partitioning as defined in 3GPP TS 28.532. Further, the plurality of AMFs (705) will perform UE registration and PDU session establishment procedures as shown in signal 2 of FIG. 9A, when the numbers of UEs associated with the plurality of AMFs (705) is lesser than the maximum number of UEs per slice.

In an embodiment, the plurality of AMFs (705) starts rejecting the UE registration messages with a back-off timer when the number of UEs reaches the allocated Maximum number of UEs per slice as shown in signal 3 of FIG. 9A. Further, the provisioning MnS producer (701) receives a Maximum number of registered subscriber for the network slice (RM.RegisteredSubNbrMax.SNSSAI) from AMF (705) and/or performance MnS producer (707) as shown in signal 4 of FIG. 9B. The provisioning MnS producer (701) determines a Maximum registered subscriber of network and network slice instance (AMFMaxRegNbr) for the AMF (705) as defined in 3GPP TS 28.554 as shown in signal 5 of FIG. 9B.

Figure 9B:
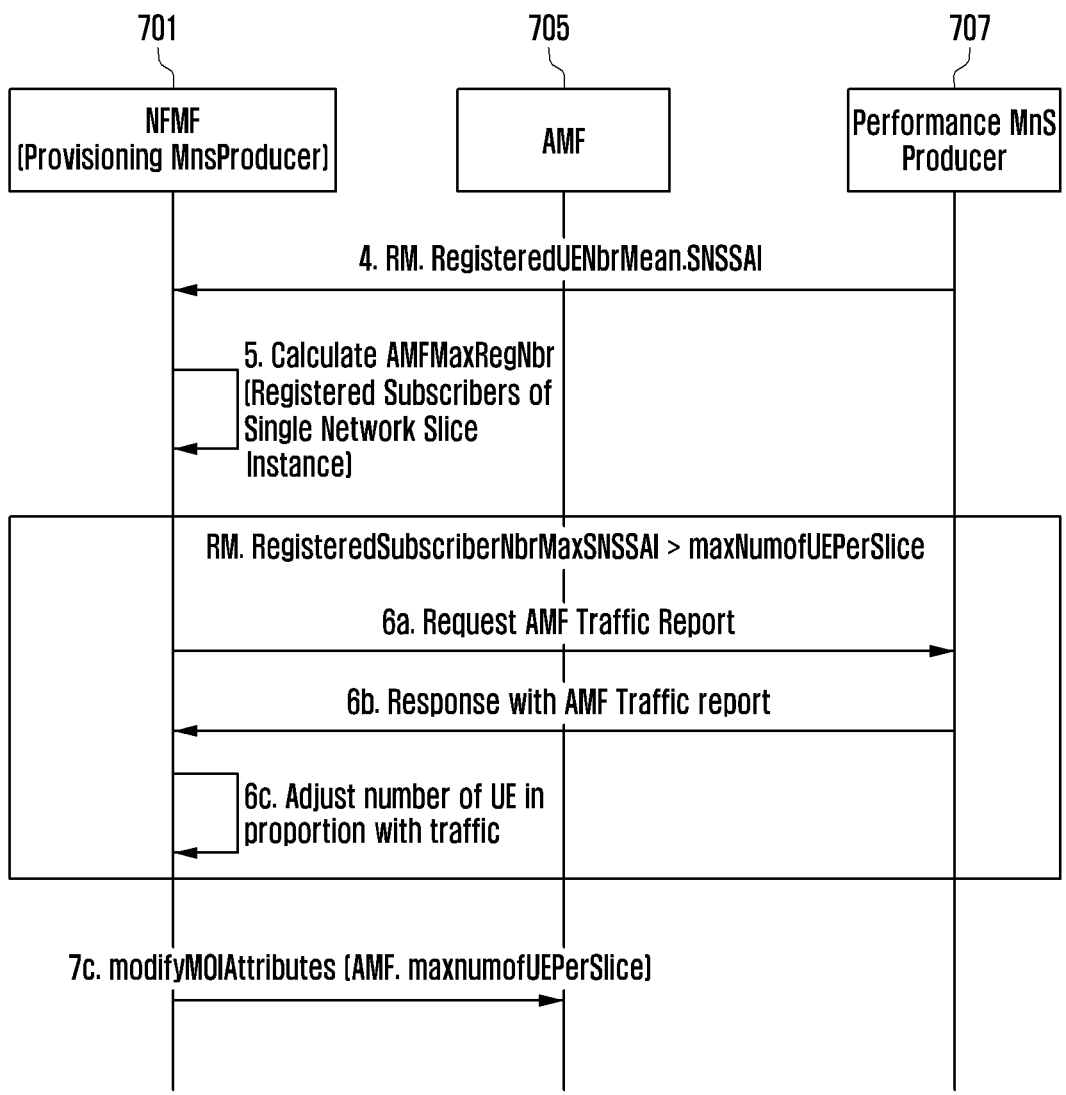
FIG. 9B is a schematic diagram illustrating the configuration and enforcement procedures for GST attribute "number of terminals", according to embodiments as disclosed herein.

In an embodiment, if the RM.RegisteredSubNbrMax.SNSSAI is greater than the maximum number of UEs per slice for AMF, then the Provisioning MnS producer (701) modifies the maximum number of UE per slice for the AMF. In case of the plurality of AMFs, the Provisioning MnS producer (701) sends a request to a Management Data Analytics Service (MDAS) producer for a traffic report associated with a plurality of AMFs (705) as shown in signal 6*a*. of FIG. 9B. Further, the provisioning MnS producer (701) receives a response with AMF(s) (705) traffic report from the MDAS producer (703) as shown in signal 6*b*. of FIG. 9B. The provisioning MnS producer (701) modifies the maximum number of UE per slice for each of the AMF (705) so that the AMFMaxRegNbr is within a permissible limit as shown in signal 6*c*. as shown in FIG. 9B. The Provisioning MnS producer (701) configures each of the AMFs (705) from the plurality of AMFs (705) as shown in signal 7*c* of FIG. 9B with an updated number of terminals per slice (i.e. maximum number of UEs per slice) using a modifyMOIAttributes operation based on the partitioning as defined in 3GPP TS 28.532.

Figure 10A:
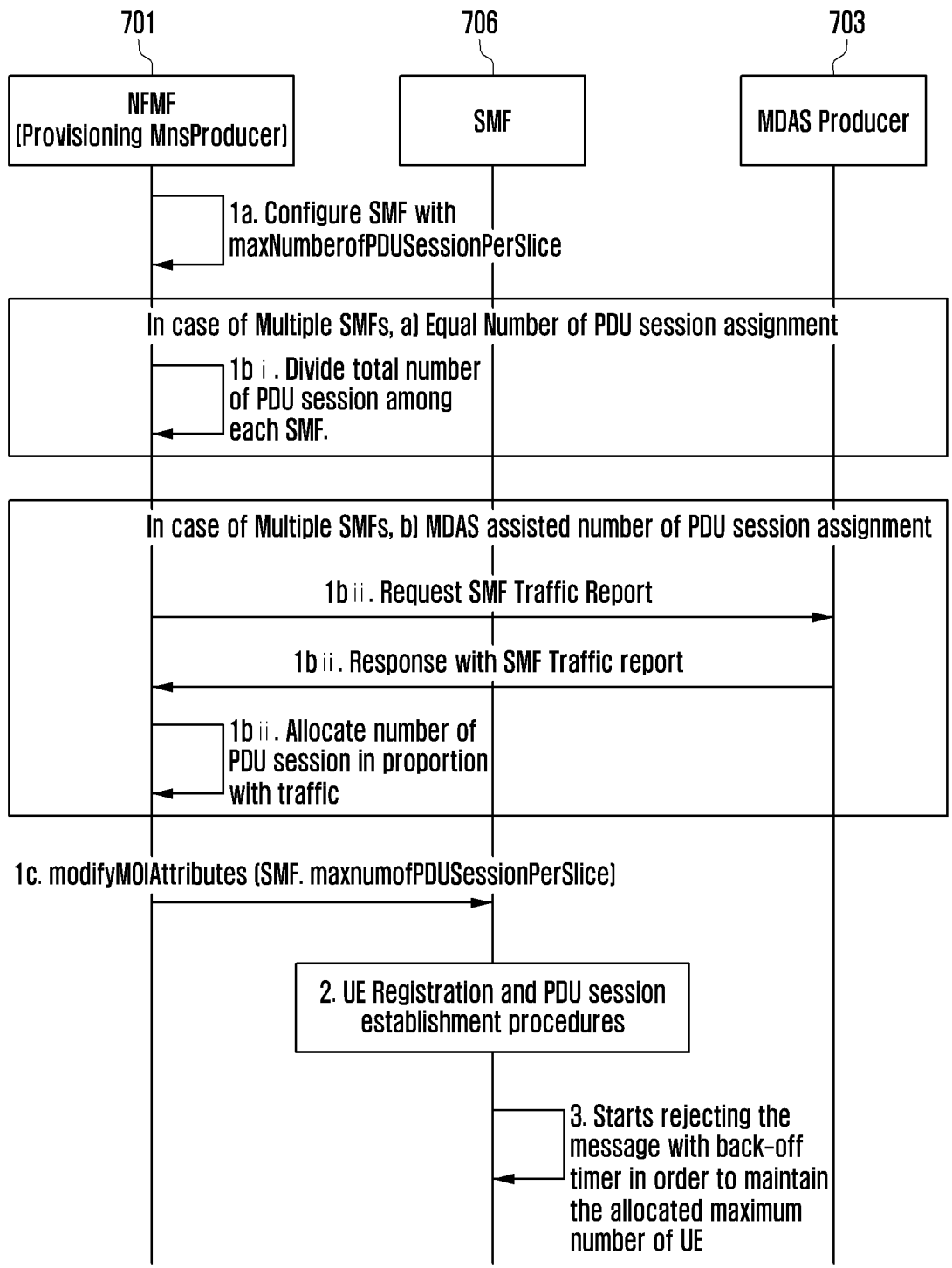
FIG. 10A is a schematic diagram illustrating the configuration and enforcement procedures for GST parameter "number of connections", according to embodiments as disclosed herein.

In an embodiment, consider the GST attribute "number of connections", the configuration and enforcement of the GST attribute at the time of provisioning the network slice is as shown in FIG. 10A. The provisioning MnS producer (701) (i.e., an OAM entity (104)) is configured to decide a number of connections (i.e., a total number of Packet Data Unit (PDU) sessions per network slice) for a Session Management Function (SMF) per network slice. When the network slice comprises a single SMF, the provisioning MnS producer (701) configures the SMF (706) with an entire quota available (i.e. a total number of PDU sessions) as shown in signal 1.*a* of FIG. 10A.

Alternatively, when the network slice comprises a plurality of SMFs, the provisioning MnS producer (701) partitions (i.e., divides) a total number PDU sessions equally to the plurality of SMFs (706) based on count of a plurality of SMFs (706) as shown in signal 1.*b.i* of FIG. 10A.

In another embodiment, when the network slice comprises a plurality of SMFs, the provisioning MnS producer (701) sends a request to a Management Data Analytics Service (MDAS) producer for a traffic report associated with a plurality of SMFs (706) as shown in signal 1.*b.ii* of FIG. 10A. Further, the provisioning MnS producer (701) receives a response with SMF(s) (706) traffic report from the MDAS producer (703) as shown in signal 1.*b.ii* of FIG. 10A. Furthermore, the provisioning MnS producer (701) partitions the total number of PDU sessions to the plurality of SMFs (706) based on a present and projected network traffic (i.e. PDU sessions) for each SMF (706) as shown in signal 1.*b.ii* of FIG. 10A. For example, the provisioning MnS producer (701) divides the total number of PDU sessions among the plurality of SMFs (706) in proportion with the traffic projections.

In an embodiment, the provisioning MnS producer (701) configures each of the SMFs (706) from the plurality of SMFs (706) as shown in signal 1.*c* of FIG. 10A with the number of connections per slice (i.e. maximum number of PDU sessions per slice) using a modifyMOIAttributes operation based on the partitioning as defined in 3GPP TS 28.532. Further, the plurality of SMFs (706) will perform UE registration and PDU session establishment procedures as shown in signal 2 of FIG. 10A, when the numbers of PDU sessions associated with the plurality of SMFs (706) is lesser than the maximum number of PDU sessions configured per slice.

In an embodiment, the plurality of SMFs (706) starts rejecting the PDU session registration messages with a back-off timer when the number of PDU sessions reaches the configured Maximum number of PDU sessions per slice as shown in signal 3 of FIG. 10A. Further, the provisioning MnS producer (701) receives a Maximum number of registered PDU sessions for the network slice (SM.SessionNbrMax.SNSSAI) from SMF (706) and/or performance MnS producer (707) as shown in signal 4 of FIG. 10B. The provisioning MnS producer (701) determines a Maximum number of established PDU sessions of network and network slice instance (PDUSesMaxNbr) for the SMF (706) as defined in 3GPP TS 28.554 as shown in signal 5 of FIG. 10B.

Figure 10B:
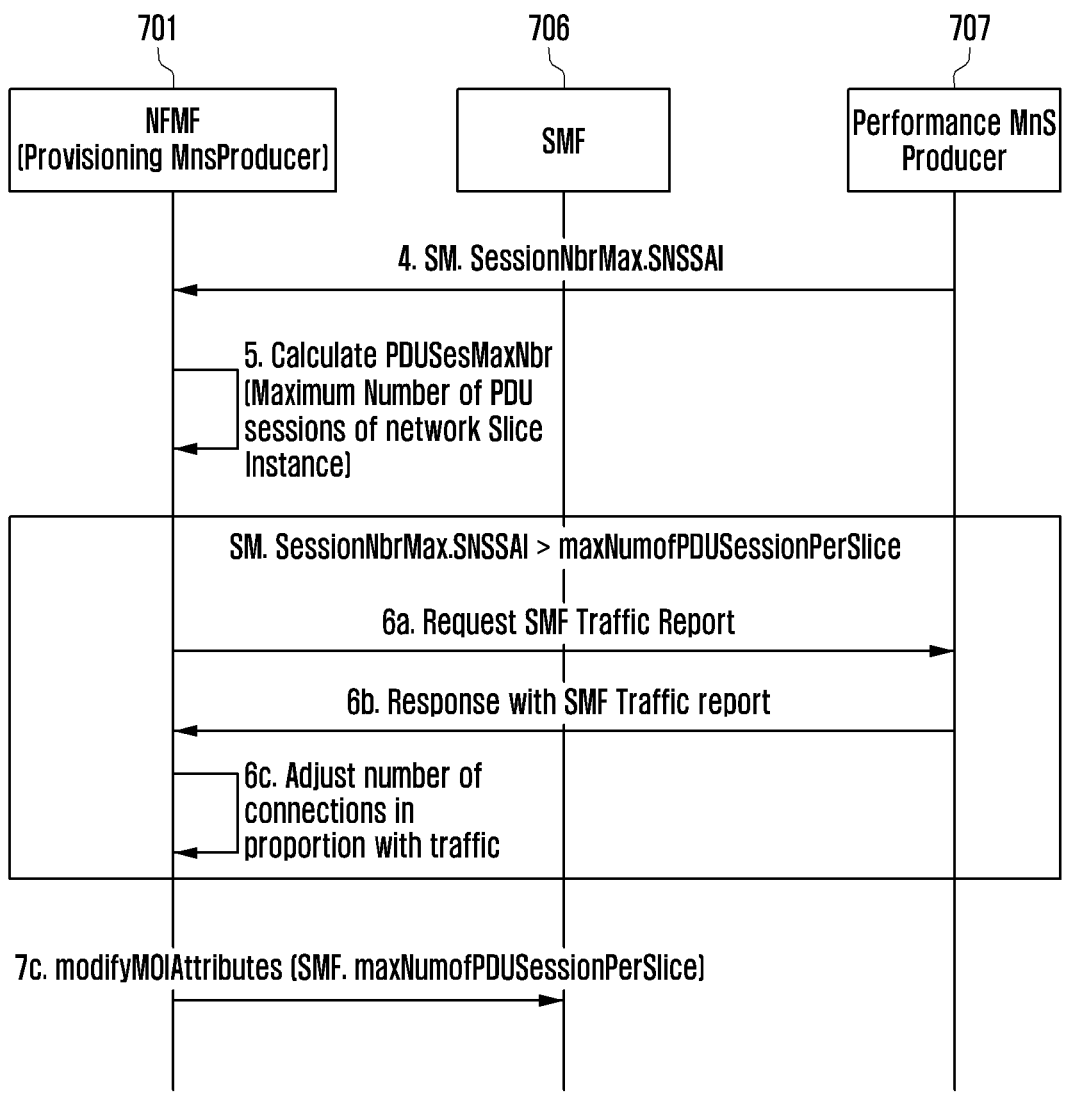
FIG. 10B is a schematic diagram illustrating the configuration and enforcement procedures for GST parameter "number of connections", according to embodiments as disclosed herein.

In an embodiment, if the SM.SessionNbrMax.SNSSAI is greater than the maximum number of PDU sessions per slice for SMF, then the Provisioning MnS producer (701) modifies the maximum number of PDU sessions per slice for the SMF. In case of the plurality of SMFs, the Provisioning MnS producer (701) sends a request to a Management Data Analytics Service (MDAS) producer for a traffic report associated with a plurality of SMFs (706) as shown in signal 6a. of FIG. 10B. Further, the provisioning MnS producer (701) receives a response with SMF(s) (706) traffic report from the MDAS producer (703) as shown in signal 6b. of FIG. 10B. The provisioning MnS producer (701) modifies the maximum number of PDU sessions per slice for each of the SMF (706) so that the PDUSesMaxNbr is within a permissible limit as shown in signal 6c. as shown in FIG. 10B. The Provisioning MnS producer (701) configures each of the SMFs (706) from the plurality of SMFs (706) as shown in signal 7c of FIG. 10B with an updated number of connections per slice (i.e. maximum number of PDU sessions per slice) using a modifyMOIAttributes operation based on the partitioning as defined in 3GPP TS 28.532.

In an embodiment, a Key Performance Indicator (KPI) associated with the maximum number of PDU sessions per network slice is determines by averaging a count of successful PDU session establishment procedures completed with the Session Management Functions (SMFs), wherein the PDU sessions are related to the network slice using the equation given below:

$$PDUSesMaxNbr = \sum_{SMF} SM \cdot SessionNbrMax \cdot SNSSAI \quad (1)$$

In an embodiment, the method comprises providing the one or more attributes (501) categorized as the non-configurable attributes in each of the one or more subnet slice profiles (102) to the corresponding one or more OAM entities (104) in the corresponding network domain for enforcing the non-configurable attributes.

In an embodiment, the one or more OAM entities include Network slice management function (NSMF (709)) and Network Slice Subnet Management Function (NSSMF (710)). Further, the non-configurable attributes are enforced by the OAM entities such as the NSMF (709), and/or NSSMF (710) at the time of slice provisioning.

Figure 11:
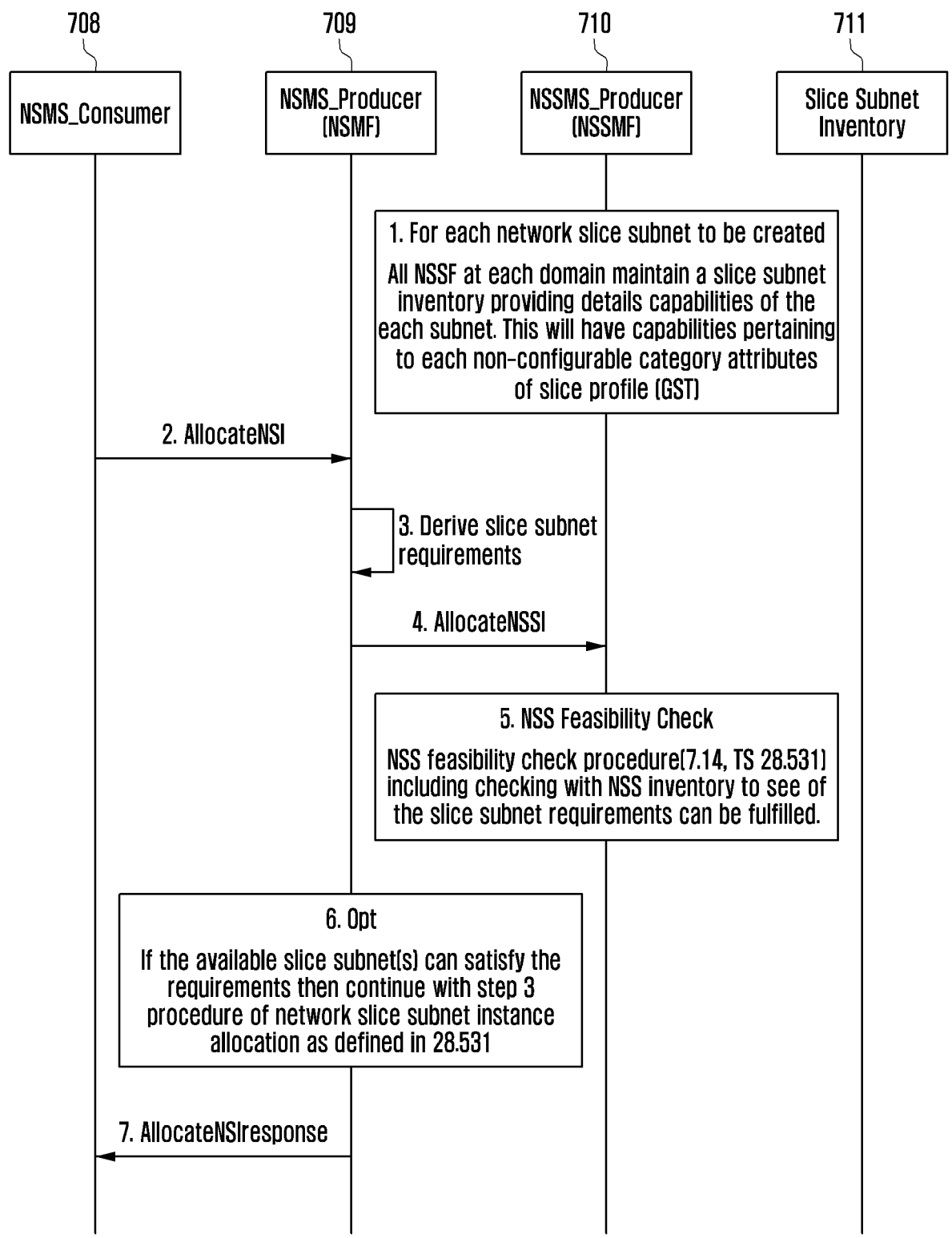
FIG. 11 is a schematic diagram illustrating enforcement procedure for Non-Configurable Attributes, according to embodiments as disclosed herein.

In an embodiment, during network planning each NSSMF (710) will maintain a subnet slice inventory (711) as shown in signal 1 of FIG. 11. The subnet slice inventory (711) includes details regarding an availability of one or more subnet slice profiles (102) and the capabilities pertaining to each of the non-configurable attributes of one or more subnet slice profiles (102). Further, enforcing the non-configurable attributes comprises receiving, by a Network Slice Management Function (NSMF (709)) (i.e., NSMS_Producer) associated with an OAM entity (104) an allocateNSI request with slice requirements (i.e. service profile (101)) from an NSMS_Consumer (708) as shown in signal 2 of FIG. 11.

In an embodiment, the NSMF (709) obtains a subnet slice requirement (i.e. one or more subnet slice profiles (102)) from the allocateNSI request with slice requirements as shown in signal 3 of FIG. 11. Further, the NSMF (709) sends the allocateNSSI request with subnet slice requirement (i.e. one or more subnet slice profiles (102)) to a Network Slice Subnet Management Function (NSSMF (710)) associated with the OAM entity (104) as shown in signal 4 of FIG. 11.

In an embodiment, the NSSMF (710) performs a feasibility check (to see if the available subnet slice can fulfill the requirements derived) of the subnet slice requirement with pre-defined subnet slice stored in a database (i.e. subnet slice inventory (711)) associated with the NSSMF (710) as shown in signal 5 of FIG. 11. The feasibility check includes determining if the pre-defined subnet slice available or stored in the database satisfy the requirements of the subnet slice (i.e. one or more subnet slice profiles (102)) from the allocateNSI request.

In an embodiment, when the pre-defined subnet slice satisfy the requirements of the subnet slice from the allocateNSI request, the NSMF (709) continues the operation performed in the signal 2 of FIG. 11 to allocate Network Slice Subnet Instance as defined in 3GPP TS 28.531 as shown in signal 6 of FIG. 11. Further, the NSMF (709) sends an AllocateNSI response to NSMS_Consumer (708) when the feasibility check is successful as shown in signal 7 of FIG. 11.

Figure 12:
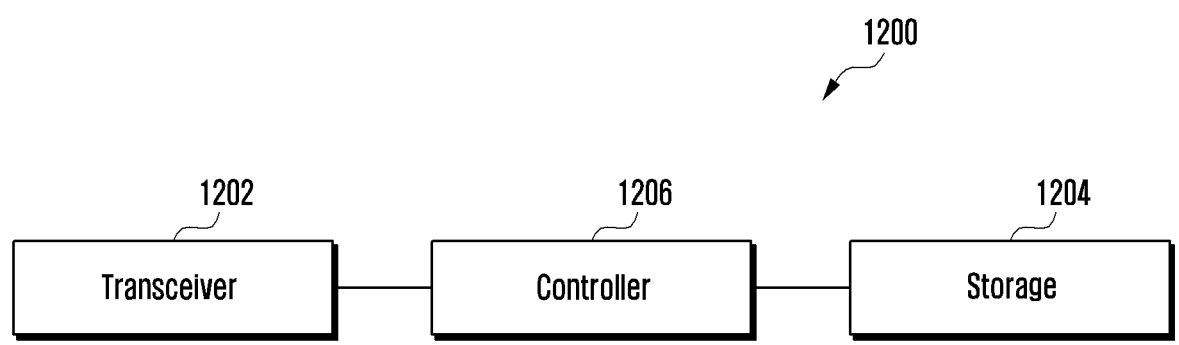
FIG. 12 is a block diagram of a network entity, according to embodiments as disclosed herein.

FIG. 12 is a block diagram of a network entity, according to the embodiments disclosed herein.

Referring to FIG. 12, a network entity (1200) of the embodiments includes a transceiver (1202), a storage (1204), and a controller (1206).

The transceiver (1202) is capable of transmitting/receiving signals to/from other entities.

The storage (1204) is capable of storing at least one of the following: information related to the network entity (1200) and information transmitted/received via the transceiver (1202).

The controller (1206) is capable of controlling operations of the network entity (1200). The controller (1206) is capable of controlling the network entity (1200) to perform operations related to the network entity (1200) as described in the embodiments.

Unlike conventional methods and systems, the missing mechanism of incorporating GST into network slice deployment, provisioning and enforcement is provided, which includes: Structured translation of each GST attributes into Service Profile and Slice Profile and enforcement mechanism for each GST attribute at appropriate domain and by appropriate entity. Also, the existing mechanism of generic slice provisioning is reused instead of re-inventing the wheel.

Abbreviations: For the purposes of the present document, the following abbreviations apply.
GST: Generic Slice Template
NSI: Network Slice Instance
NSSI: Network Slice subnet Instance
NSMS: Network Slice Management Service
NSSMS: Network Slice Subnet Management Service
NSMF (709): Network Slice Management Function
NSSMF (710): Network Slice Subnet Management Function
MnS: Management Service The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a network slice management service (NSMS) producer in a communication system, the method comprising:
   identifying a service profile based on a list of one or more generic network slice template (GST) attributes;
   identifying a slice profile for a core network (CN) domain and a slice profile for a radio access network (RAN) domain based on the service profile, wherein the slice profile for the CN domain is used to carry one or more CN domain requirements and the slice profile for the RAN domain is used to carry one or more RAN domain requirements;
   translating a CN domain requirement among the one or more CN domain requirements into a configurable parameter related to network function behavior in the CN domain; and
   translating a RAN domain requirement among the one or more RAN domain requirements into a configurable parameter related to network function behavior in the RAN domain,
   wherein a CN domain requirement not translated into a configurable parameter among the one or more CN domain requirements is kept at operations, administration maintenance (OAM) domain and is used for behavior of a network slice, and
   wherein a RAN domain requirement not translated into a configurable parameter among the one or more RAN domain requirements is kept at the OAM domain and is used for behavior of a network slice.

2. The method of claim 1, wherein identifying the slice profile for the CN domain and the slice profile for the RAN domain further comprising:
   identifying one or more transport network (TN) requirements based on the service profile.

3. The method of claim 2, further comprising:
   translating one or more requirements in the service profile into one or more requirements in a root slice profile; and
   identifying the slice profile for the CN domain, the slice profile for the RAN domain, and the one or more TN requirements based on the root slice profile.

4. The method of claim 1,
   wherein a maximum number of UEs in the slice profile for the CN domain is identified based on a maximum number of UEs in the service profile, and
   wherein the maximum number of UEs in the slice profile for the CN domain is translated into the configurable parameter related to network function behavior in the CN domain.

5. The method of claim 1,
   wherein a maximum number of UEs in the slice profile for the RAN domain is identified based on a maximum number of UEs in the service profile,
   wherein the maximum number of UEs in the slice profile for the RAN domain is translated into the configurable parameter related to network function behavior in the RAN domain.

6. The method of claim 1,
   wherein a maximum number of protocol data unit (PDU) sessions in the slice profile for the CN domain is identified based on a maximum number of connections in the service profile, and
   wherein the maximum number of PDU sessions in the slice profile for the CN domain is translated into the configurable parameter related to network behavior in the CN domain.

7. The method of claim 1,
   wherein a key performance indicator (KPI) is associated with a maximum number of PDU sessions of the network slice, and
   wherein the KPI is obtained based on successful PDU session establishment procedures of session management functions (SMFs) which are associated with the network slice.

8. A network slice management service (NSMS) producer in a communication system, the NSMS producer comprising:
   a transceiver; and
   a controller configured to:
      identify a service profile based on a list of one or more generic network slice template (GST) attributes,
      identify a slice profile for a core network (CN) domain and a slice profile for a radio access network (RAN) domain based on the service profile, wherein the slice profile for the CN domain is used to carry one or more CN domain requirements and the slice profile for the RAN domain is used to carry one or more RAN domain requirements,
      translate a CN domain requirement among the one or more CN domain requirements into a configurable parameter related to network function behavior in the CN domain, and
      translate a RAN domain requirement among the one or more RAN domain requirements into a configurable parameter related to network function behavior in the RAN domain,
   wherein a CN domain requirement not translated into a configurable parameter among the one or more CN domain requirements is kept at operations, administration maintenance (OAM) domain and is used for behavior of a network slice, and
   wherein a RAN domain requirement not translated into a configurable parameter among the one or more RAN domain requirements is kept at the OAM domain and is used for behavior of a network slice.

9. The NSMS producer of claim 8, wherein the controller is further configured to:
   identify one or more transport network (TN) requirements based on the service profile.

10. The NSMS producer of claim 9, wherein the controller is further configured to:
    translate one or more requirements in the service profile into one or more requirements in a root slice profile, and
    identify the slice profile for the CN domain, the slice profile for the RAN domain, and the one or more TN requirements based on the root slice profile.

11. The NSMS producer of claim 8,
    wherein a maximum number of UEs in the slice profile for the CN domain is identified based on a maximum number of UEs in the service profile, and
    wherein the maximum number of UEs in the slice profile for the CN domain is translated into the configurable parameter related to network function behavior in the CN domain.

12. The NSMS producer of claim 8,
    wherein a maximum number of UEs in the slice profile for the RAN domain is identified based on a maximum number of UEs in the service profile, and
    wherein the maximum number of UEs in the slice profile for the RAN domain is translated into the configurable parameter related to network function behavior in the RAN domain.

13. The NSMS producer of claim 8,
wherein a maximum number of protocol data unit (PDU) sessions in the slice profile for the CN domain is identified based on a maximum number of connections in the service profile, and
wherein the maximum number of PDU sessions in the slice profile for the CN domain is translated into the configurable parameter related to network behavior in the CN domain.

14. The NSMS producer of claim 8,
wherein a key performance indicator (KPI) is associated with a maximum number of PDU sessions of the network slice, and
wherein the KPI is obtained based on successful PDU session establishment procedures of session management functions (SMFs) which are associated with the network slice.

* * * * *